US012232647B2

(12) United States Patent
Anthony et al.

(10) Patent No.: US 12,232,647 B2
(45) Date of Patent: Feb. 25, 2025

(54) STOWABLE COUNTERTOP COOKING SYSTEM

(71) Applicant: SHARKNINJA OPERATING LLC, Needham, MA (US)

(72) Inventors: Joshua D. Anthony, Billerica, MA (US); Ethan T. Brown, Cambridge, MA (US); Richard Rhys Mathias, Brookline, MA (US); Nicholas Varjabedian, Middleboro, MA (US); Nathaniel R. Lavins, Somerville, MA (US); Ross Richardson, Dover, MA (US); Jack David Clark, Brighton, MA (US); James Richard Potter, Windsor (GB)

(73) Assignee: SharkNinja Operating LLC, Needham, MA (US)

( * ) Notice: Subject to any disclaimer, the term of this patent is extended or adjusted under 35 U.S.C. 154(b) by 913 days.

(21) Appl. No.: 16/801,765

(22) Filed: Feb. 26, 2020

(65) Prior Publication Data
US 2020/0268200 A1 Aug. 27, 2020

Related U.S. Application Data

(60) Provisional application No. 62/810,639, filed on Feb. 26, 2019.

(51) Int. Cl.
A47J 36/34 (2006.01)
A47J 27/00 (2006.01)
A47J 37/06 (2006.01)

(52) U.S. Cl.
CPC ............ A47J 36/34 (2013.01); A47J 27/004 (2013.01); A47J 37/0635 (2013.01)

(58) Field of Classification Search
CPC .. A47J 37/0623; A47J 37/041; A47J 37/0629; A47J 37/0641; A47J 37/043;
(Continued)

(56) References Cited

U.S. PATENT DOCUMENTS 1,021,413 A 3/1912 Koch
1,769,893 A 7/1930 Uhl
(Continued)

FOREIGN PATENT DOCUMENTS

CN 1124097 C 10/2003
CN 1666067 A 9/2005
(Continued)

OTHER PUBLICATIONS

Directive for Consultation; Japanese Application No. 2019-027096; International Filing Date: Dec. 6, 2019; Date of Mailing: Feb. 19, 2021; 2 pages, no translation.
(Continued)

Primary Examiner — Vy T Nguyen
(74) Attorney, Agent, or Firm — Mintz, Levin, Cohn, Ferris, Glovsky and Popeo, P.C.

(57) ABSTRACT

A cooking system positionable on a support surface including a housing having an internal heating compartment and an opening formed in said housing for accessing said internal heating compartment. The housing is movable between a first position and second position. The opening is arranged within a first plane when said housing is in said first position, and the opening is arranged within a second plane when said housing is in said second position, said first plane and said second plane being distinct.

22 Claims, 18 Drawing Sheets

(58) Field of Classification Search
CPC ...... A47J 37/0064; A47J 27/002; A47J 36/00;
A47J 37/04; A47J 37/042; A47J 37/046;
A47J 37/0658; A47J 43/04; F24C 15/325;
F24C 15/023; F24C 15/028; F24C 15/16;
F24C 15/164; F24C 7/087; H05B 6/6408;
H05B 6/6473; H05B 6/687
USPC ... 99/339, 391, 329 RT, 327, 340, 357, 419,
99/328, 385, 389, 400, 401, 331, 375,
99/421 V, 474, 332, 333, 334, 335, 337,
99/338, 365, 377, 386, 399, 421 H,
99/421 R, 427, 443 C, 444, 447, 450,
99/473, 475, 479, 480, 483, 484;
126/21 A, 273 R, 19 R, 37 B, 19 M, 21 R,
126/41 R, 211, 273 A, 9 R, 198, 20, 20.1,
126/214 A, 220, 29, 332, 37 A, 39 G,
126/39 R, 41 C, 77; 312/236, 308, 209,
312/227, 245, 31, 321.5, 322, 327, 350;
426/523, 418; 392/416; 361/735, 744,
361/829; 206/501, 549; 220/315, 371,
220/87; 219/400, 386, 452.13, 218, 392,
219/393, 394, 521, 679, 757, 391, 408,
219/412, 478, 492, 387, 388, 402, 405,
219/411, 450.1, 451.1, 452.11, 476, 483,
219/486, 489, 506, 507, 622, 624, 680,
219/681, 702, 720, 725, 756
See application file for complete search history.

(56) References Cited

U.S. PATENT DOCUMENTS

| | | |
|---|---|---|
| 1,772,171 A | 8/1930 | Wells |
| 1,912,353 A | 5/1933 | Howe |
| 2,092,226 A | 9/1937 | Simons, Jr. |
| 2,693,141 A | 11/1954 | Johnson et al. |
| 2,711,684 A | 6/1955 | Taylor |
| 2,745,937 A | 5/1956 | Welch |
| 2,958,754 A | 11/1960 | Hahn |
| 4,645,905 A | 2/1987 | Ming |
| 4,889,042 A | 12/1989 | Hantz et al. |
| 5,011,353 A | 4/1991 | Boyd |
| 5,335,310 A | 8/1994 | Novy et al. |
| 5,584,231 A | 12/1996 | Deleon |
| 5,642,657 A | 7/1997 | Yeung et al. |
| 6,060,701 A | 5/2000 | McKee et al. |
| 6,073,624 A | 6/2000 | Laurent |
| 6,122,437 A | 9/2000 | Johnson |
| 6,188,045 B1 | 2/2001 | Hansen et al. |
| 6,222,163 B1 | 4/2001 | Arntz et al. |
| 6,244,552 B1 | 6/2001 | Adams et al. |
| 6,291,808 B1 | 9/2001 | Brown |
| 6,294,769 B1 | 9/2001 | McCarter |
| 6,369,360 B1 | 4/2002 | Cook |
| 6,371,104 B1 | 4/2002 | Voohris |
| 6,378,602 B2 | 4/2002 | Brown |
| 6,437,291 B1 | 8/2002 | Hopponen |
| 6,472,640 B2 | 10/2002 | Brown et al. |
| 6,516,712 B1 | 2/2003 | Ratermann et al. |
| 6,521,870 B2 | 2/2003 | Nolan et al. |
| 6,539,934 B2 | 4/2003 | Moshonas et al. |
| 6,543,338 B2 | 4/2003 | Chasen et al. |
| 6,566,638 B2 | 5/2003 | Brown |
| 6,570,136 B1 | 5/2003 | Lockwood et al. |
| 6,603,102 B2 | 8/2003 | Brown et al. |
| 6,624,396 B2 | 9/2003 | Witt et al. |
| 6,670,591 B2 | 12/2003 | Shon et al. |
| 6,718,965 B2 | 4/2004 | Rummel et al. |
| 6,730,881 B1 | 5/2004 | Arntz et al. |
| 6,732,637 B2 | 5/2004 | Artt |
| 6,734,403 B2 | 5/2004 | Baker et al. |
| 6,837,234 B2 | 1/2005 | Rabas et al. |
| 6,854,456 B1 | 2/2005 | Friedrich et al. |
| 6,854,457 B2 | 2/2005 | Rabas et al. |
| 6,874,495 B2 | 4/2005 | McFadden |
| 6,881,054 B2 | 4/2005 | Levi et al. |
| 6,903,309 B2 | 6/2005 | Rhinehart |
| 6,914,219 B2 | 7/2005 | Kuhne |
| 6,917,017 B2 | 7/2005 | Moon et al. |
| 6,928,379 B2 | 8/2005 | Fulton et al. |
| 6,930,284 B2 | 8/2005 | Kang |
| 6,943,321 B2 | 9/2005 | Carbone et al. |
| 6,943,324 B2 | 9/2005 | Ahuja |
| 7,044,122 B2 | 5/2006 | Personnettaz et al. |
| 7,060,940 B2 | 6/2006 | Kim et al. |
| 7,066,168 B1 | 6/2006 | Patent |
| 7,075,442 B2 | 7/2006 | Lion et al. |
| 7,105,778 B1 | 9/2006 | Delong et al. |
| 7,297,904 B2 | 11/2007 | Paller |
| 7,301,128 B2 | 11/2007 | Li et al. |
| 7,309,846 B2 | 12/2007 | Haberkamm et al. |
| 7,329,838 B2 | 2/2008 | Song et al. |
| 7,339,138 B1 | 3/2008 | Brooks |
| 7,340,993 B2 | 3/2008 | Sculuca |
| 7,354,612 B2 | 4/2008 | Friel, Sr. |
| 7,368,683 B2 | 5/2008 | Kim et al. |
| 7,420,140 B2 | 9/2008 | Lenhart, Jr. et al. |
| 7,423,241 B2 | 9/2008 | Hanson |
| 7,442,901 B2 | 10/2008 | Kim et al. |
| 7,554,057 B2 | 6/2009 | Monny Dimouamoua |
| 7,592,570 B2 | 9/2009 | Yoder et al. |
| 7,750,271 B2 | 7/2010 | Smith et al. |
| 7,750,272 B2 | 7/2010 | Furnlanetto et al. |
| 7,775,202 B2 | 8/2010 | Chen |
| 7,793,586 B2 | 9/2010 | Rabas |
| 7,798,138 B2 | 9/2010 | Babington |
| 7,872,213 B2 | 1/2011 | De Leon et al. |
| 7,901,721 B2 | 3/2011 | Oosterling |
| 7,921,768 B2 | 4/2011 | Fernandez et al. |
| 7,964,824 B2 | 6/2011 | Moon |
| 8,029,274 B2 | 10/2011 | Jones et al. |
| 8,035,062 B2 | 10/2011 | McFadden et al. |
| 8,042,533 B2 | 10/2011 | Dobie et al. |
| 8,049,142 B2 | 11/2011 | Blackson et al. |
| 8,063,342 B2 | 11/2011 | Hines, Jr. |
| 8,069,776 B2 | 12/2011 | Glucksman et al. |
| 8,071,922 B2 | 12/2011 | Claesson et al. |
| 8,087,407 B2 | 1/2012 | Wiker et al. |
| 8,097,833 B2 | 1/2012 | Bonuso et al. |
| 8,106,334 B2 | 1/2012 | Nam |
| 8,138,452 B2 | 3/2012 | Thomas et al. |
| 8,138,453 B2 | 3/2012 | Yang et al. |
| 8,145,548 B2 | 3/2012 | De Luca |
| 8,168,928 B2 | 5/2012 | Kim et al. |
| 8,173,942 B2 | 5/2012 | Wiseman et al. |
| 8,193,470 B1 | 6/2012 | Harlamert et al. |
| 8,258,435 B2 | 9/2012 | Bonuso et al. |
| 8,281,779 B2 | 10/2012 | Wiker et al. |
| 8,299,406 B2 | 10/2012 | Zhou et al. |
| 8,304,695 B2 | 11/2012 | Bonuso et al. |
| 8,350,192 B2 | 1/2013 | Phillips et al. |
| 8,371,285 B2 | 2/2013 | Wiker et al. |
| 8,378,265 B2 | 2/2013 | Greenwood et al. |
| 8,415,591 B2 | 4/2013 | Boyer et al. |
| 8,534,779 B2 | 9/2013 | Schaaf |
| 8,614,408 B2 | 12/2013 | Kamii |
| 8,642,928 B2 | 2/2014 | Schult |
| 8,674,270 B2 | 3/2014 | Anderson et al. |
| 8,731,385 B2 | 5/2014 | De Luca |
| 8,735,778 B2 | 5/2014 | Greenwood et al. |
| 8,748,783 B2 | 6/2014 | Hensel et al. |
| 8,859,941 B2 | 10/2014 | Gladhill et al. |
| 8,930,160 B2 | 1/2015 | Wall et al. |
| 8,946,602 B2 | 2/2015 | Hertzberg et al. |
| 8,946,604 B2 | 2/2015 | Kaiser et al. |
| 8,950,319 B2 | 2/2015 | Nam et al. |
| 8,991,383 B2 | 3/2015 | Johnson |
| 8,993,934 B2 | 3/2015 | Giazzon et al. |
| 8,997,635 B2 | 4/2015 | Buzick et al. |
| 9,016,191 B2 | 4/2015 | Krolick et al. |
| 9,060,640 B2 | 6/2015 | Barrows et al. |
| 9,074,776 B2 | 6/2015 | Greenwood et al. |

(56) References Cited

U.S. PATENT DOCUMENTS

| | | |
|---|---|---|
| 9,089,005 B2 | 7/2015 | Boedicker et al. |
| 9,157,640 B2 | 10/2015 | Distaso et al. |
| 9,220,276 B2 | 12/2015 | Howard |
| 9,267,692 B2 | 2/2016 | Cescot et al. |
| 9,314,134 B2 | 4/2016 | Molnar |
| 9,335,054 B2 | 5/2016 | Donarski |
| 9,372,000 B2 | 6/2016 | Ploof et al. |
| 9,395,088 B2 | 6/2016 | Wiggins et al. |
| 9,395,089 B2 | 6/2016 | Nelson et al. |
| 9,402,472 B1 | 8/2016 | Levi |
| 9,402,505 B2 | 8/2016 | Johncock et al. |
| 9,404,660 B1 | 8/2016 | Karabin et al. |
| 9,408,497 B2 * | 8/2016 | Conti .................. A47J 37/08 |
| 9,418,528 B2 | 8/2016 | Stokes |
| 9,474,284 B2 | 10/2016 | Dougherty |
| 9,474,413 B2 | 10/2016 | Romandy |
| 9,482,586 B2 | 11/2016 | Chen et al. |
| 9,526,374 B2 | 12/2016 | Kim |
| 9,534,794 B2 | 1/2017 | Rogers et al. |
| 9,545,154 B2 | 1/2017 | Duke |
| 9,554,421 B2 | 1/2017 | Meusburger |
| 9,629,499 B2 | 4/2017 | Kim |
| 9,643,037 B2 | 5/2017 | Vermeersch et al. |
| 9,664,422 B2 | 5/2017 | Godecker et al. |
| 9,677,774 B2 | 6/2017 | Mckee et al. |
| 9,681,773 B2 | 6/2017 | McKee et al. |
| 9,689,576 B2 | 6/2017 | Johnson et al. |
| 9,726,379 B2 | 8/2017 | Wiseman et al. |
| 9,737,936 B2 | 8/2017 | Linglin et al. |
| 9,746,189 B2 | 8/2017 | Kantas |
| 9,841,261 B2 | 12/2017 | Raghavan et al. |
| 9,863,644 B2 | 1/2018 | Bond et al. |
| 9,874,353 B2 | 1/2018 | Thabit |
| 9,900,936 B2 | 2/2018 | Imm et al. |
| 9,903,598 B2 | 2/2018 | Greenwood et al. |
| 9,920,934 B2 | 3/2018 | Donarski et al. |
| 9,924,830 B1 | 3/2018 | Glucksman et al. |
| 9,927,127 B2 | 3/2018 | Johnson et al. |
| 10,004,358 B2 | 6/2018 | Wildebush |
| 10,016,092 B2 | 7/2018 | Barrows et al. |
| 10,022,008 B1 | 7/2018 | Staton et al. |
| 10,024,541 B2 | 7/2018 | Wojick et al. |
| 10,024,548 B2 | 7/2018 | Wiker et al. |
| 10,028,608 B2 | 7/2018 | Carbone et al. |
| 10,034,609 B2 | 7/2018 | Sun et al. |
| 10,036,558 B2 | 7/2018 | Wiker et al. |
| 10,058,210 B2 | 8/2018 | Palermo |
| 10,064,244 B2 | 8/2018 | Cheng et al. |
| 10,082,297 B2 | 9/2018 | Kim et al. |
| 10,088,172 B2 | 10/2018 | McKee et al. |
| 10,094,575 B2 | 10/2018 | Evans et al. |
| 10,101,038 B2 | 10/2018 | Kim et al. |
| 10,119,706 B2 | 11/2018 | Chadwick et al. |
| 10,119,708 B2 | 11/2018 | Bartelick et al. |
| 10,132,505 B2 | 11/2018 | Son et al. |
| 10,154,549 B2 | 12/2018 | Nasu et al. |
| 10,156,366 B2 | 12/2018 | Braden et al. |
| 10,182,680 B2 | 1/2019 | Koetz |
| 10,190,783 B2 | 1/2019 | Rogers et al. |
| 10,222,071 B2 | 3/2019 | Deng et al. |
| 10,234,145 B2 | 3/2019 | Chadwick et al. |
| 10,240,387 B2 | 3/2019 | Nelson |
| 10,244,778 B2 | 4/2019 | Armstrong et al. |
| 10,253,988 B2 | 4/2019 | Colozzo et al. |
| 10,253,989 B2 | 4/2019 | Helm et al. |
| 10,258,195 B2 | 4/2019 | Blomberg |
| 10,271,686 B2 | 4/2019 | Roy |
| 10,274,205 B2 | 4/2019 | Cecchin et al. |
| 10,288,295 B2 | 5/2019 | Chadwick et al. |
| 10,288,311 B2 | 5/2019 | Cho et al. |
| 10,302,309 B2 | 5/2019 | Paller |
| 10,314,315 B2 | 6/2019 | Hegge et al. |
| 10,317,091 B2 | 6/2019 | Chadwick et al. |
| 10,322,661 B2 | 6/2019 | Babington et al. |
| 10,327,587 B2 | 6/2019 | Liao |
| 10,327,592 B2 | 6/2019 | Wu |
| 10,337,745 B2 | 7/2019 | McKee et al. |
| 10,359,200 B2 | 7/2019 | Braden et al. |
| 10,368,403 B2 | 7/2019 | Hayashi et al. |
| 10,371,391 B2 | 8/2019 | Teaciuc |
| 10,405,696 B2 | 9/2019 | Kim |
| 10,408,467 B2 | 9/2019 | Chadwick et al. |
| 10,441,110 B2 | 10/2019 | Hensel et al. |
| 10,448,457 B2 | 10/2019 | Johnson et al. |
| 10,451,290 B2 | 10/2019 | Mayberry |
| 10,517,429 B2 | 12/2019 | West et al. |
| 10,520,199 B2 | 12/2019 | Polster |
| 10,524,615 B2 | 1/2020 | Reales Bertomeo et al. |
| 10,527,290 B2 | 1/2020 | Armstrong |
| 10,561,274 B2 | 2/2020 | Huang |
| 10,582,573 B2 | 3/2020 | Hoare et al. |
| 10,591,166 B2 | 3/2020 | Reinhart |
| 10,591,168 B2 | 3/2020 | Yang et al. |
| 10,598,549 B2 | 3/2020 | Hedlund et al. |
| 10,624,497 B1 | 4/2020 | Bumgarner et al. |
| 10,732,652 B2 | 4/2020 | Yazdi et al. |
| 10,660,470 B2 | 5/2020 | Li et al. |
| 10,682,010 B2 | 6/2020 | Hoare et al. |
| 10,728,962 B2 | 7/2020 | Rollet et al. |
| 10,731,869 B2 | 8/2020 | Ghiglieri et al. |
| 10,842,318 B2 | 11/2020 | Feldman et al. |
| 10,865,999 B2 | 12/2020 | Neal |
| 10,883,724 B2 | 1/2021 | Moon et al. |
| 11,071,404 B2 | 7/2021 | Yan et al. |
| 11,103,326 B2 | 8/2021 | Bettencourt |
| 11,105,514 B2 | 8/2021 | Lim et al. |
| 11,175,048 B2 | 11/2021 | Murad |
| 2001/0039884 A1 * | 11/2001 | Backus ............ A47J 37/0658 99/421 V |
| 2002/0023911 A1 | 2/2002 | Bales et al. |
| 2002/0162833 A1 | 11/2002 | Arntz et al. |
| 2003/0015514 A1 | 1/2003 | Choat et al. |
| 2003/0015518 A1 | 1/2003 | Baker et al. |
| 2003/0116555 A1 | 6/2003 | Wakefield et al. |
| 2003/0146201 A1 | 8/2003 | Smith et al. |
| 2003/0146205 A1 | 8/2003 | Rael et al. |
| 2003/0192885 A1 | 10/2003 | Shon et al. |
| 2003/0226452 A1 | 12/2003 | Artt |
| 2004/0040950 A1 | 3/2004 | Carbone et al. |
| 2004/0059538 A1 | 3/2004 | Fulton et al. |
| 2004/0129692 A1 | 7/2004 | Kim et al. |
| 2004/0178192 A1 | 9/2004 | Muegge et al. |
| 2004/0200822 A1 | 10/2004 | Boyer |
| 2004/0216731 A1 | 11/2004 | Personnettaz et al. |
| 2004/0261632 A1 | 12/2004 | Hansen et al. |
| 2005/0006382 A1 | 1/2005 | Hayakawa et al. |
| 2005/0056267 A1 | 3/2005 | Levi et al. |
| 2005/0057910 A1 | 3/2005 | Schnurr |
| 2005/0217503 A1 | 10/2005 | Mcfadden |
| 2006/0003277 A1 | 1/2006 | Jeng |
| 2006/0113295 A1 | 6/2006 | Fisher et al. |
| 2006/0163238 A1 | 7/2006 | Miller et al. |
| 2006/0192468 A1 | 8/2006 | Gardner |
| 2006/0213373 A1 | 9/2006 | Fernandez et al. |
| 2006/0289441 A1 | 12/2006 | Bartelick |
| 2007/0012307 A1 | 1/2007 | Wiker et al. |
| 2007/0084849 A1 | 4/2007 | Smith et al. |
| 2007/0095813 A1 | 5/2007 | Sung et al. |
| 2007/0277678 A1 | 12/2007 | Mangano |
| 2008/0037965 A1 | 2/2008 | De Luca |
| 2008/0087200 A1 | 4/2008 | Salmon et al. |
| 2008/0105135 A1 | 5/2008 | McFadden et al. |
| 2008/0128403 A1 | 6/2008 | Jones et al. |
| 2008/0149089 A1 | 6/2008 | Karabin et al. |
| 2008/0156202 A1 | 7/2008 | Park et al. |
| 2008/0185372 A1 | 8/2008 | Elkasevic |
| 2008/0185373 A1 | 8/2008 | Elkasevic et al. |
| 2008/0185942 A1 | 8/2008 | Elkasevic et al. |
| 2009/0134151 A1 | 5/2009 | Bogatin et al. |
| 2009/0165657 A1 | 7/2009 | Cheng |
| 2010/0024662 A1 * | 2/2010 | Bengtson ............ A47J 37/0611 99/377 |
| 2010/0092275 A1 | 4/2010 | Savitz |
| 2010/0147824 A1 | 6/2010 | Bonuso et al. |

(56) References Cited

U.S. PATENT DOCUMENTS

| | | |
|---|---|---|
| 2010/0231105 A1 | 9/2010 | Latif |
| 2010/0282097 A1 | 11/2010 | Schulte |
| 2010/0282738 A1 | 11/2010 | Leikam et al. |
| 2010/0326980 A1 | 12/2010 | Shingler |
| 2011/0100352 A1* | 5/2011 | Palmeto ............. F24C 3/12 |
| 2011/0100974 A1 | 5/2011 | Steer |
| 2011/0151072 A1 | 6/2011 | Anderson et al. |
| 2012/0058234 A1 | 3/2012 | Navon |
| 2012/0160111 A1 | 6/2012 | Hozumi et al. |
| 2012/0163780 A1 | 6/2012 | De Luca |
| 2012/0237646 A1 | 9/2012 | De Luca |
| 2013/0101240 A1 | 4/2013 | Jährling et al. |
| 2013/0153562 A1 | 6/2013 | Cescot et al. |
| 2013/0233182 A1 | 9/2013 | Hunt et al. |
| 2014/0016916 A1 | 1/2014 | Lee |
| 2014/0158676 A1 | 6/2014 | Phillips et al. |
| 2014/0261371 A1 | 9/2014 | Van Camp et al. |
| 2014/0283811 A1 | 9/2014 | Kernshner et al. |
| 2015/0047514 A1 | 2/2015 | Abe et al. |
| 2015/0122242 A1 | 5/2015 | Murray |
| 2015/0208863 A1 | 7/2015 | Buzick et al. |
| 2015/0260416 A1 | 9/2015 | Chadwick et al. |
| 2015/0354827 A1 | 12/2015 | Faraldi et al. |
| 2015/0359046 A1 | 12/2015 | Mohseni |
| 2015/0369491 A1 | 12/2015 | Estrella et al. |
| 2016/0045069 A1* | 2/2016 | Benitez ............. A47J 37/08 |
| | | 426/418 |
| 2016/0096050 A1 | 4/2016 | Vermeersch et al. |
| 2016/0220057 A1 | 8/2016 | Smith et al. |
| 2016/0258634 A1 | 9/2016 | Helm et al. |
| 2016/0296012 A1 | 10/2016 | Ciccacci et al. |
| 2017/0010004 A1 | 1/2017 | Bettencourt |
| 2017/0112155 A1 | 4/2017 | Franzolin |
| 2017/0115008 A1 | 4/2017 | Erbe et al. |
| 2017/0127700 A1 | 5/2017 | Armstrong et al. |
| 2017/0215639 A1 | 8/2017 | Chang et al. |
| 2017/0285597 A1 | 10/2017 | Franzolin |
| 2017/0318629 A1 | 11/2017 | Mohseni |
| 2018/0038737 A1 | 2/2018 | Hedlund et al. |
| 2018/0045421 A1 | 2/2018 | Bailie |
| 2018/0115161 A1 | 4/2018 | Marsh-Croft et al. |
| 2018/0132648 A1 | 5/2018 | Furlanetto et al. |
| 2018/0134204 A1 | 5/2018 | Aplin |
| 2018/0139805 A1 | 5/2018 | Hayashi |
| 2018/0142900 A1 | 5/2018 | McKee et al. |
| 2018/0152996 A1 | 5/2018 | Carcano et al. |
| 2018/0153000 A1 | 5/2018 | Carcano et al. |
| 2018/0156469 A1 | 6/2018 | Paller |
| 2018/0184669 A1 | 7/2018 | Haas et al. |
| 2018/0206677 A1 | 7/2018 | Ivarsson et al. |
| 2018/0224127 A1 | 8/2018 | Lambert et al. |
| 2018/0235239 A1 | 8/2018 | Reese et al. |
| 2018/0238560 A1 | 8/2018 | Deng et al. |
| 2018/0289213 A1 | 10/2018 | Stanford |
| 2018/0317705 A1 | 11/2018 | Roy |
| 2018/0332999 A1 | 11/2018 | Nie |
| 2019/0008322 A1 | 1/2019 | Feldman et al. |
| 2019/0069719 A1 | 3/2019 | Huang et al. |
| 2019/0110630 A1 | 4/2019 | Kitabayashi et al. |
| 2019/0120500 A1 | 4/2019 | Kim et al. |
| 2019/0120502 A1 | 4/2019 | Zanchetta et al. |
| 2019/0142206 A1 | 5/2019 | Yan et al. |
| 2019/0142216 A1 | 5/2019 | Huang et al. |
| 2019/0159288 A1 | 5/2019 | Warwick |
| 2019/0166850 A1 | 6/2019 | Bailie |
| 2019/0170368 A1 | 6/2019 | Rogers et al. |
| 2019/0254471 A1 | 8/2019 | Reinhard-Herrscher et al. |
| 2019/0282029 A1 | 9/2019 | Goldberg |
| 2019/0313846 A1 | 10/2019 | Abukashef |
| 2019/0331536 A1 | 10/2019 | Hioki et al. |
| 2019/0350407 A1 | 11/2019 | Sharpe et al. |
| 2019/0357319 A1 | 11/2019 | Bassill et al. |
| 2020/0011535 A1 | 1/2020 | Lambert et al. |
| 2020/0029735 A1 | 1/2020 | Tofaili et al. |
| 2020/0037816 A1 | 2/2020 | Hackley |
| 2020/0060470 A1 | 2/2020 | Bate |
| 2020/0069113 A1 | 3/2020 | Anthony et al. |
| 2020/0093329 A1 | 3/2020 | Glucksman |
| 2020/0173663 A1 | 6/2020 | Yang et al. |
| 2020/0217504 A1 | 7/2020 | Hensley |
| 2020/0281391 A1 | 9/2020 | Swayne et al. |
| 2021/0270467 A1 | 9/2021 | Murad |
| 2021/0372630 A1 | 12/2021 | Murad |
| 2022/0065459 A1 | 3/2022 | Murad |
| 2022/0120445 A1 | 4/2022 | Murad |
| 2022/0186937 A1 | 6/2022 | Murad |

FOREIGN PATENT DOCUMENTS

| | | | |
|---|---|---|---|
| CN | 2927930 Y | | 8/2007 |
| CN | 101502388 A | | 8/2009 |
| CN | 100574687 C | | 12/2009 |
| CN | 101091625 B | | 2/2011 |
| CN | 20178596 U | * | 4/2011 |
| CN | 101484756 B | | 5/2012 |
| CN | 102472496 A | | 5/2012 |
| CN | 202698901 U | | 1/2013 |
| CN | 203195501 U | | 9/2013 |
| CN | 203914492 U | | 11/2014 |
| CN | 102697404 B | * | 12/2014 |
| CN | 204016052 | * | 12/2014 |
| CN | 204146894 U | * | 2/2015 |
| CN | 104783642 A | | 7/2015 |
| CN | 204427667 U | | 7/2015 |
| CN | 105009687 A | | 10/2015 |
| CN | 105147130 A | | 12/2015 |
| CN | 204931396 U | | 1/2016 |
| CN | 204931397 U | | 1/2016 |
| CN | 204970939 U | | 1/2016 |
| CN | 105662172 A | | 6/2016 |
| CN | 105708180 A | | 6/2016 |
| CN | 205697311 U | | 11/2016 |
| CN | 106196182 A | | 12/2016 |
| CN | 106214012 A | | 12/2016 |
| CN | 205795486 U | | 12/2016 |
| CN | 106413477 A | | 2/2017 |
| CN | 106419618 A | | 2/2017 |
| CN | 106539503 A | | 3/2017 |
| CN | 206006997 U | | 3/2017 |
| CN | 206007052 U | | 3/2017 |
| CN | 106662335 A | | 5/2017 |
| CN | 106724895 A | | 5/2017 |
| CN | 106821018 A | | 6/2017 |
| CN | 106821025 A | | 6/2017 |
| CN | 206414143 U | | 8/2017 |
| CN | 107143891 A | | 9/2017 |
| CN | 206548360 U | | 10/2017 |
| CN | 206641763 U | | 11/2017 |
| CN | 107495855 A | | 12/2017 |
| CN | 105852659 B | | 2/2018 |
| CN | 107661027 A | | 2/2018 |
| CN | 107713767 A | | 2/2018 |
| CN | 107847064 A | | 3/2018 |
| CN | 207071051 U | | 3/2018 |
| CN | 107928444 A | | 4/2018 |
| CN | 207306565 U | | 5/2018 |
| CN | 108158242 A | | 6/2018 |
| CN | 108185838 A | | 6/2018 |
| CN | 108354469 A | | 8/2018 |
| CN | 108392098 A | | 8/2018 |
| CN | 108523630 A | | 9/2018 |
| CN | 207804022 U | | 9/2018 |
| CN | 207804081 U | | 9/2018 |
| CN | 207870767 U | | 9/2018 |
| CN | 108814331 A | | 11/2018 |
| CN | 208048599 U | | 11/2018 |
| CN | 208114513 U | | 11/2018 |
| CN | 108968709 A | | 12/2018 |
| CN | 109059059 A | | 12/2018 |
| CN | 208192773 U | | 12/2018 |
| CN | 109419379 A | | 3/2019 |
| CN | 109431290 A | | 3/2019 |
| CN | 109464016 A | | 3/2019 |
| CN | 109497820 A | | 3/2019 |

(56) References Cited

FOREIGN PATENT DOCUMENTS

| | | |
|---|---|---|
| CN | 208610551 U | 3/2019 |
| CN | 208625320 U | 3/2019 |
| CN | 209712532 U | 3/2019 |
| CN | 107280448 B | 4/2019 |
| CN | 109645808 A | 4/2019 |
| CN | 109645809 A | 4/2019 |
| CN | 208692933 U | 4/2019 |
| CN | 208692935 U | 4/2019 |
| CN | 208709570 U | 4/2019 |
| CN | 208740622 U | 4/2019 |
| CN | 208740631 U | 4/2019 |
| CN | 208769451 U | 4/2019 |
| CN | 208769454 U | 4/2019 |
| CN | 208769558 U | 4/2019 |
| CN | 208837593 U | 5/2019 |
| CN | 208905522 U | 5/2019 |
| CN | 208909702 U | 5/2019 |
| CN | 208941783 U | 6/2019 |
| CN | 208957617 U | 6/2019 |
| CN | 208957778 U | 6/2019 |
| CN | 208973345 U | 6/2019 |
| CN | 208973366 U | 6/2019 |
| CN | 209003525 U | 6/2019 |
| CN | 209047883 U | 7/2019 |
| CN | 209058777 U | 7/2019 |
| CN | 209058815 U | 7/2019 |
| CN | 209121883 U | 7/2019 |
| CN | 107741038 B | 8/2019 |
| CN | 209235721 U | 8/2019 |
| CN | 209235732 U | 8/2019 |
| CN | 209252419 U | 8/2019 |
| CN | 209252420 U | 8/2019 |
| CN | 209315609 U | 8/2019 |
| CN | 209391650 U | 9/2019 |
| CN | 110353515 A | 10/2019 |
| CN | 209450370 U | 10/2019 |
| CN | 209547804 U | 10/2019 |
| CN | 110403444 A | 11/2019 |
| CN | 209574358 U | 11/2019 |
| CN | 209661251 U | 11/2019 |
| CN | 107744329 B | 12/2019 |
| CN | 110584452 A | 12/2019 |
| CN | 110604453 A | 12/2019 |
| CN | 209826268 U | 12/2019 |
| CN | 209863300 U | 12/2019 |
| CN | 209863301 U | 12/2019 |
| CN | 209863302 U | 12/2019 |
| CN | 209863303 U | 12/2019 |
| CN | 209863304 U | 12/2019 |
| CN | 209863306 U | 12/2019 |
| CN | 209863308 U | 12/2019 |
| CN | 209863317 U | 12/2019 |
| CN | 110731694 A | 1/2020 |
| CN | 209899161 U | 1/2020 |
| CN | 209966076 U | 1/2020 |
| CN | 209995896 U | 1/2020 |
| CN | 209995897 U | 1/2020 |
| CN | 209995898 U | 1/2020 |
| CN | 209995899 U | 1/2020 |
| CN | 209995927 U | 1/2020 |
| CN | 209995930 U | 1/2020 |
| CN | 110742493 A | 2/2020 |
| CN | 110786723 A | 2/2020 |
| CN | 110786724 A | 2/2020 |
| CN | 210019026 U | 2/2020 |
| CN | 210124571 U | 3/2020 |
| CN | 210124572 U | 3/2020 |
| CN | 210124573 U | 3/2020 |
| CN | 210124574 U | 3/2020 |
| CN | 210124575 U | 3/2020 |
| CN | 210124576 U | 3/2020 |
| CN | 210124577 U | 3/2020 |
| CN | 210124579 U | 3/2020 |
| CN | 210124628 U | 3/2020 |
| CN | 210169717 U | 3/2020 |
| CN | 210169718 U | 3/2020 |
| CN | 210169780 U | 3/2020 |
| CN | 110946465 A | 4/2020 |
| CN | 210276843 U | 4/2020 |
| CN | 210300599 U | 4/2020 |
| CN | 111110009 A | 5/2020 |
| CN | 210433346 U | 5/2020 |
| CN | 210446663 U | 5/2020 |
| CN | 210520760 U | 5/2020 |
| CN | 210540950 U | 5/2020 |
| CN | 210582123 U | 5/2020 |
| CN | 210697141 U | 6/2020 |
| CN | 210697167 U | 6/2020 |
| CN | 210810510 U | 6/2020 |
| CN | 210871007 U | 6/2020 |
| CN | 111358268 A | 7/2020 |
| CN | 111358269 A | 7/2020 |
| CN | 111358270 A | 7/2020 |
| CN | 111358271 A | 7/2020 |
| CN | 111358272 A | 7/2020 |
| CN | 111358274 A | 7/2020 |
| CN | 111358275 A | 7/2020 |
| CN | 210902571 U | 7/2020 |
| CN | 210989616 U | 7/2020 |
| CN | 210989619 U | 7/2020 |
| CN | 210989629 U | 7/2020 |
| CN | 211022157 U | 7/2020 |
| CN | 211022158 U | 7/2020 |
| CN | 211022267 U | 7/2020 |
| CN | 211049077 U | 7/2020 |
| CN | 211066122 U | 7/2020 |
| CN | 211066229 U | 7/2020 |
| CN | 211093326 U | 7/2020 |
| CN | 211155193 U | 8/2020 |
| CN | 211186811 U | 8/2020 |
| CN | 212346260 U | 1/2021 |
| CN | 112386119 A | 2/2021 |
| CN | 113317691 A | 8/2021 |
| DE | 2453080 A1 | 5/1975 |
| DE | 2409370 A1 | 9/1975 |
| DE | 3319724 A1 | 12/1984 |
| DE | 3401002 A1 | 7/1985 |
| DE | 3628617 A1 | 3/1988 |
| DE | 11200400002 B4 | 7/2006 |
| EP | 0833110 B1 | 4/1998 |
| EP | 1772085 A1 | 4/2007 |
| EP | 1884687 A1 | 10/2007 |
| EP | 2090206 A1 | 8/2009 |
| EP | 2417880 A2 | 2/2012 |
| EP | 2893859 A1 | 7/2015 |
| EP | 2648582 B1 | 8/2016 |
| EP | 3287051 A1 | 2/2018 |
| EP | 3003104 B1 | 9/2019 |
| EP | 3003107 B1 | 9/2019 |
| EP | 3203886 B1 | 3/2020 |
| FR | 1320733 A | 3/1963 |
| GB | 778036 A * | 7/1957 |
| GB | 1140386 A | 1/1969 |
| GB | 1488907 A | 10/1977 |
| GB | 2197578 A | 5/1988 |
| GB | 2212713 A | 8/1989 |
| GB | 2401307 A | 6/2004 |
| GB | 2470292 A * | 11/2010 |
| GB | 2490540 A | 11/2012 |
| GB | 2523365 A | 8/2015 |
| JP | S4999557 U | 8/1974 |
| JP | S5688437 U | 7/1981 |
| JP | S61143533 U | 9/1986 |
| JP | H01178504 U | 12/1989 |
| JP | H01300124 A | 12/1989 |
| JP | H0368823 U | 7/1991 |
| JP | H08473 A | 1/1996 |
| WO | 2010094690 A1 | 8/2010 |
| WO | 2011144762 A1 | 11/2011 |
| WO | 2012012479 A1 | 1/2012 |
| WO | 2012018161 A1 | 2/2012 |
| WO | 2012062679 A1 | 5/2012 |
| WO | 2012162072 A1 | 11/2012 |
| WO | 2013008813 A1 | 1/2013 |

(56) References Cited

FOREIGN PATENT DOCUMENTS

| | | |
|---|---|---|
| WO | 2014132105 A1 | 9/2014 |
| WO | 2014153134 A1 | 9/2014 |
| WO | 2014196676 A1 | 12/2014 |
| WO | 2015101875 A1 | 7/2015 |
| WO | 2015118867 A1 | 8/2015 |
| WO | 2015164875 A1 | 10/2015 |
| WO | 2017109717 A1 | 6/2017 |
| WO | 2017188526 A1 | 11/2017 |
| WO | 2017207930 A1 | 12/2017 |
| WO | 2018019766 A1 | 2/2018 |
| WO | 2018091225 A1 | 5/2018 |
| WO | 2018172404 A1 | 9/2018 |
| WO | 2018187458 A2 | 10/2018 |
| WO | 2019038172 A1 | 2/2019 |
| WO | 2019068202 A1 | 4/2019 |
| WO | 2019129598 A1 | 7/2019 |
| WO | 2019137013 A1 | 7/2019 |
| WO | 2019171404 A1 | 9/2019 |
| WO | 2019218685 A1 | 11/2019 |
| WO | 2019223963 A1 | 11/2019 |
| WO | 2019238994 A1 | 12/2019 |
| WO | 2020000052 A1 | 1/2020 |
| WO | 2020000056 A1 | 1/2020 |
| WO | 2020014142 A1 | 1/2020 |
| WO | 2020077974 A1 | 4/2020 |
| WO | 2020148329 A1 | 7/2020 |
| WO | 2020173027 A1 | 9/2020 |
| WO | 2020177410 A1 | 9/2020 |
| WO | 2020180643 A1 | 9/2020 |
| WO | 2020245087 A1 | 12/2020 |

OTHER PUBLICATIONS

Directive for Consultation; Japanese Application No. 2020-024087; International Filing Date: Nov. 9, 2020; Date of Mailing: Feb. 19, 2021; 2 pages, no translation.

International Search Report of the International Searching Authority; International Application No. PCT/US2020/019855; International Filing Date: Feb. 26, 2020; Date of Mailing: Nov. 26, 2020; 9 pages.

Invitation to Pay Additional Fees for International Application No. PCT/US2020/019855; International Filing Date: Feb. 26, 2020; Date of Mailing: Oct. 2, 2020; 11 pages.

Notification of Reasons for Rejection; Japanese Application No. 2019-027096; International Filing Date: Dec. 6, 2019; Date of Mailing: Feb. 19, 2021; 2 pages, no translation.

Notification of Reasons for Rejection; Japanese Application No. 2020-024087; International Filing Date: Nov. 9, 2020; Date of Mailing: Feb. 19, 2021; 2 pages, no translation.

Sharp, Richard. "Crostino Twists Your Toast—Avoids Burnt Fingers." Gadgets and Gizmos, Mar. 6, 2012, 7:39 p.m., www.gadgetsandgizmos.org/crostino-twists-your-toast-avoids-burnt-fingers/.

U.S. Non-Final Office Action; U.S. Appl. No. 17/139,747; Application Filing Date: Dec. 31, 2020; Date of Mailing: Feb. 26, 2021; 54 pages.

Written Opinion of the International Searching Authority; International Application No. PCT/US2020/019855; International Filing Date: Feb. 26, 2020; Date of Mailing: Nov. 26, 2020; 13 pages.

Breville, "The Smart Oven Air, Instruction Book—Suits all BOV900 models, "Breville, BOV900 USCB16, 2016, pp. 1-68.

Cuisinart, "Cuisinart, Instruction and Receipe Booklet, Cuisinart AirFryer Toaster Oven," TOA-60, Cuisinart, IB-14326- EPS-B, 2019, pp. 1-74.

Japanese Office Action; International Application No. 2019-27096; International Filing Date: Dec. 6, 2019; Date of Mailing: Aug. 7, 2020; 2 pages.

Ninja, "Foodi Digital Air Fry Oven—Owner's Guide, SP100 Series," NinjaKitchen, SP100_Series_IB_E_F_S_MP_Mv5, 2019, pp. 1-29.

Wikipedia, [online]; [retrieved on Mar. 3, 2020]; retrieved from the Internet https://en.wikipedia.org/wiki/Phase-fired_controllerWikipedia, "Phase-fired controller," Wikipedia, Aug. 4, 2019, pp. 1-3.

Wikipedia, [online]; [retrieved on Mar. 3, 2020]; retrieved from the Internethttps://en.wikipedia.org/wiki/Zero_crossingWikipedia, "Zero Crossing," Wikipedia, Jun. 8, 2019, pp. 1-2.

* cited by examiner

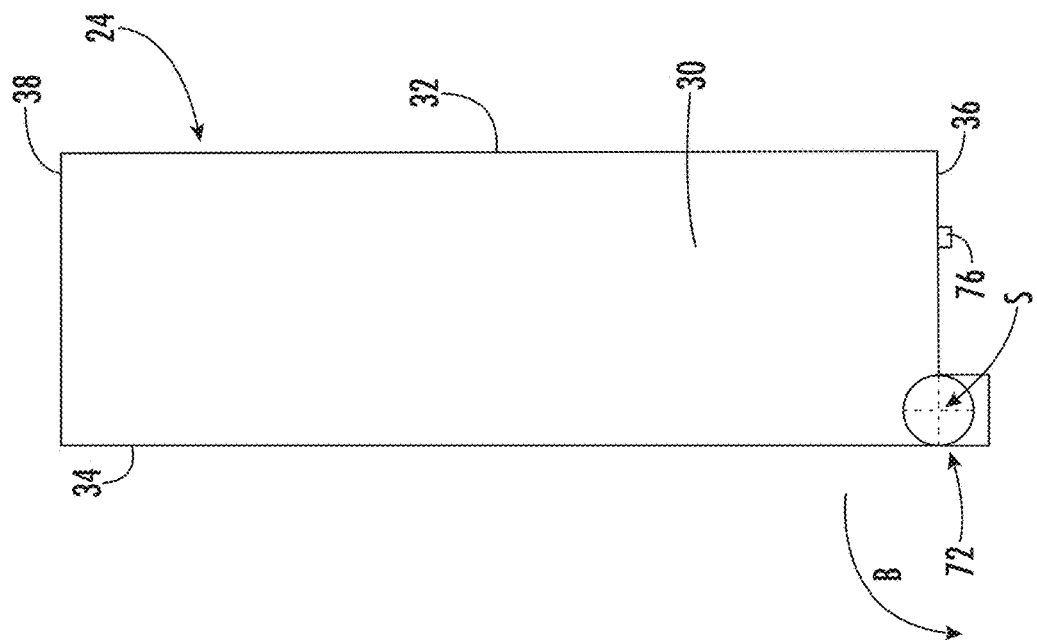
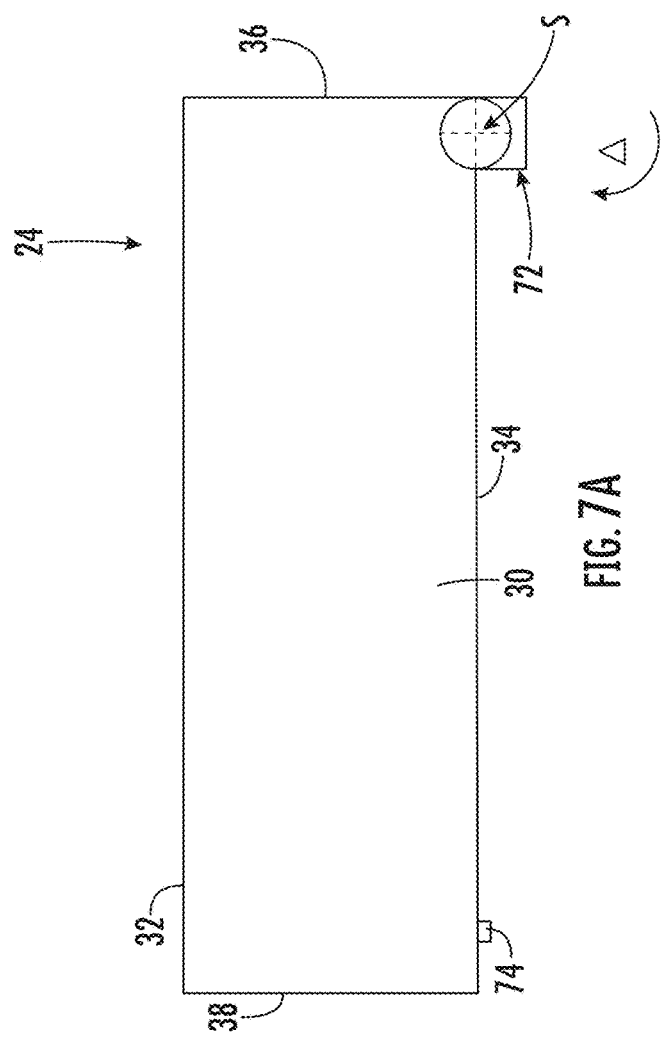
FIG. 7B
FIG. 7A

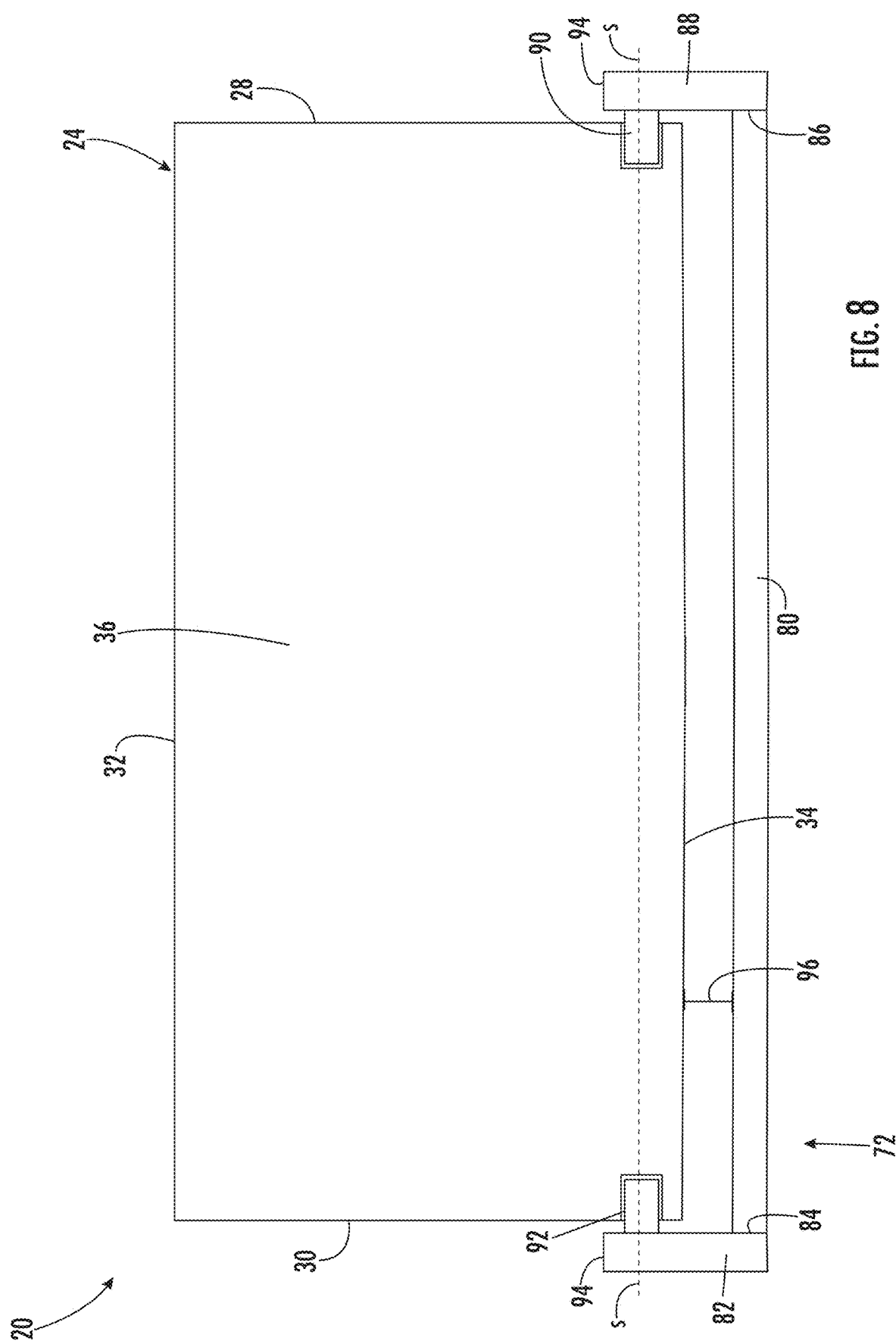

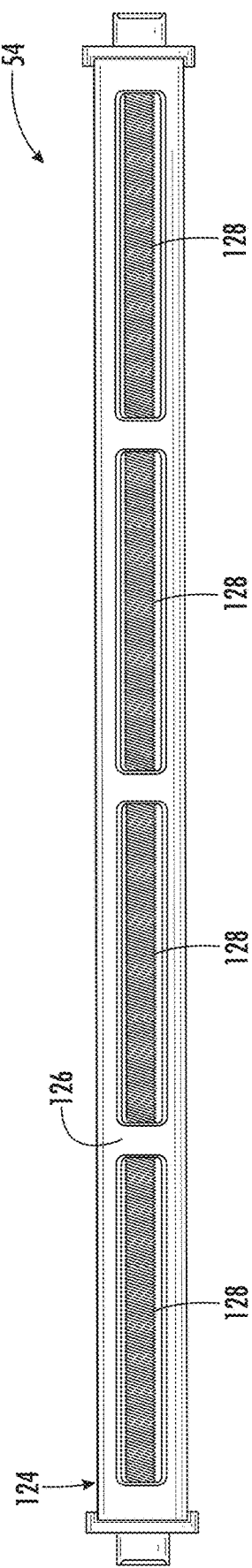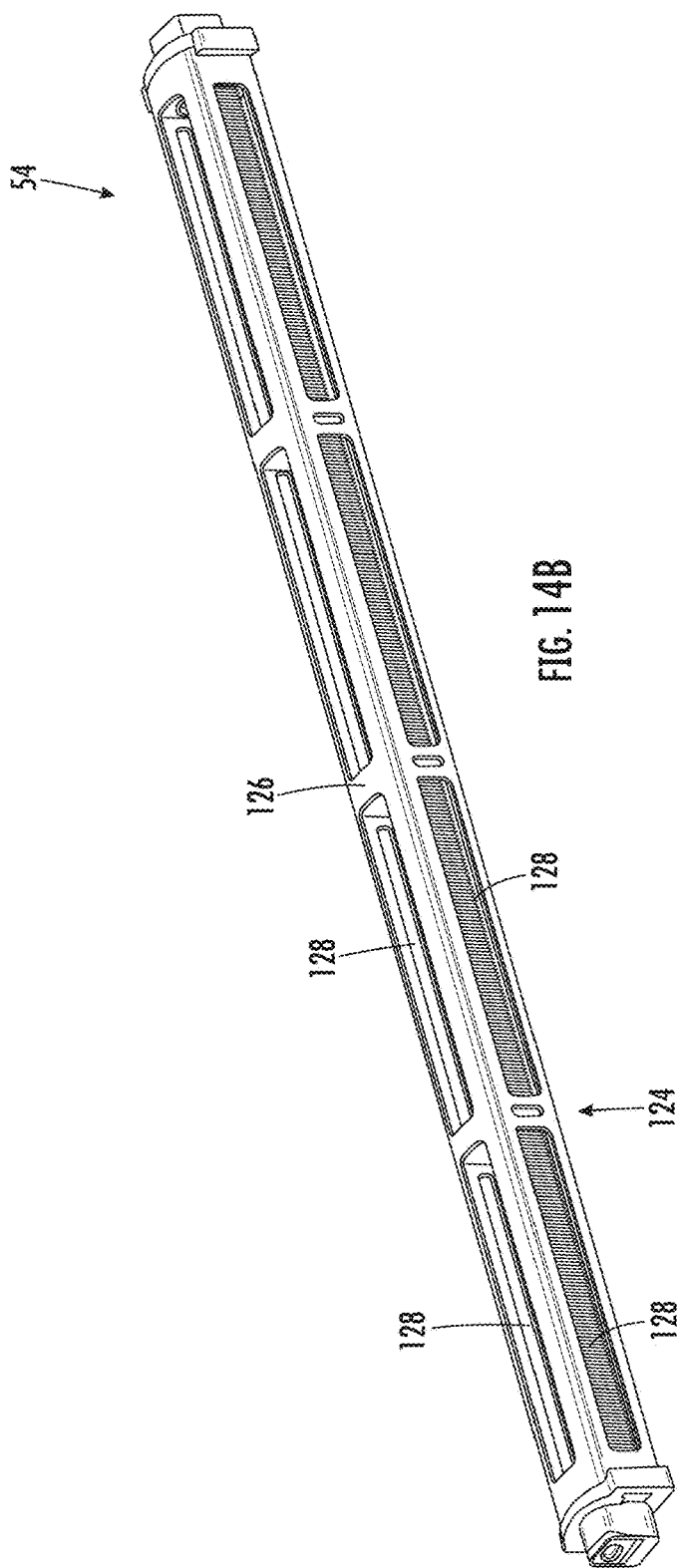
FIG. 14A
FIG. 14B

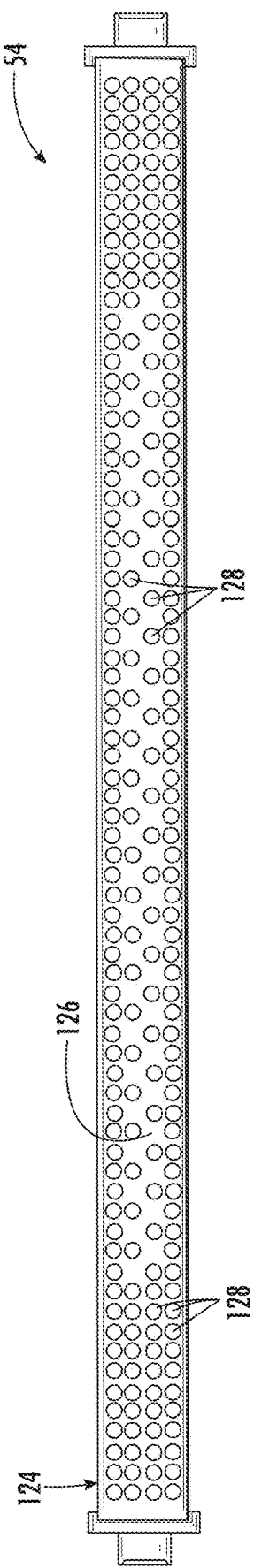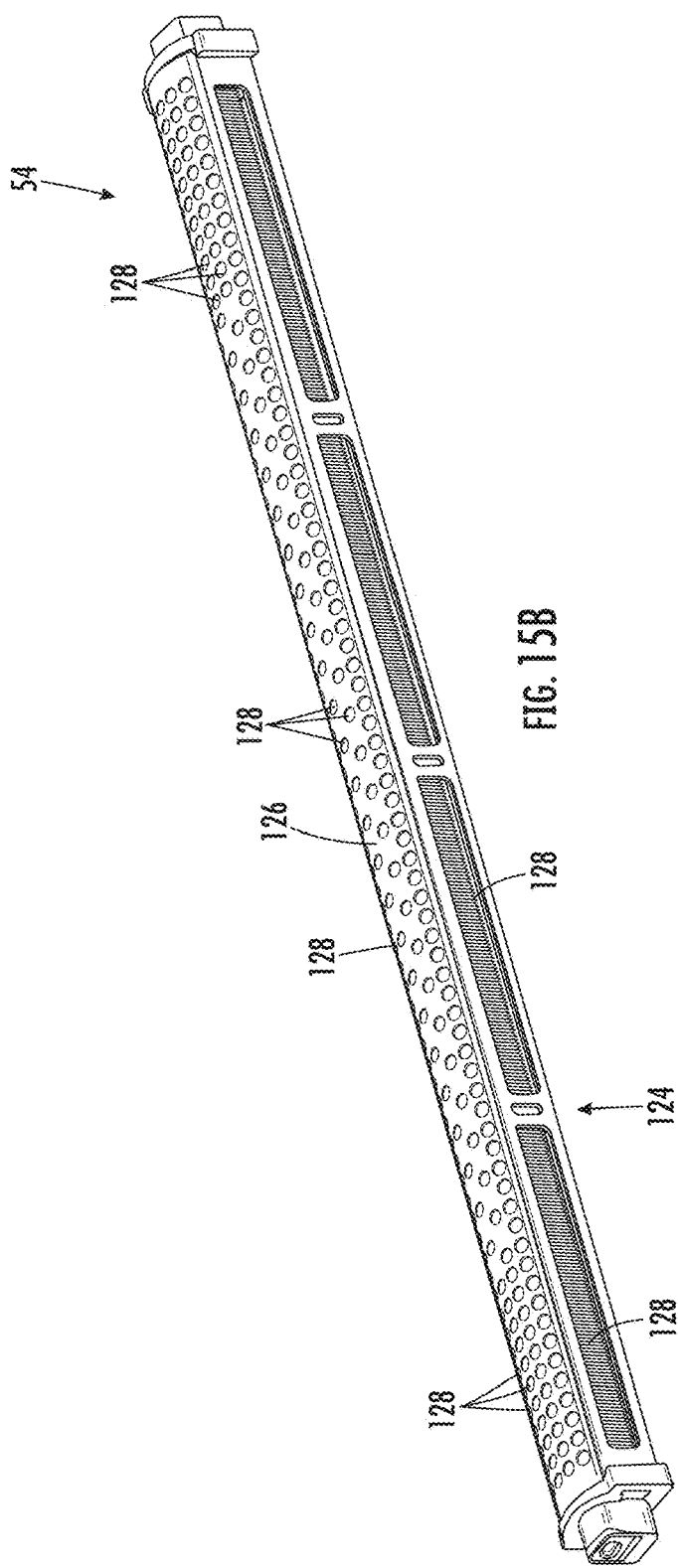

STOWABLE COUNTERTOP COOKING SYSTEM

CROSS-REFERENCE TO RELATED APPLICATIONS

This application is claims priority to U.S. Provisional Application Ser. No. 62/810,639, filed Feb. 26, 2019, the entire contents of which are incorporated herein by reference.

BACKGROUND

Embodiments of the present disclosure relate generally to a cooking system, and more particularly, to a countertop cooking system having a stowed position that requires minimal counter space.

Existing countertop cooking systems, such as toaster ovens for example, may be used to conveniently warm or cook food in place of a larger wall mounted oven or a range for example. Countertop cooking systems typically cover a substantial amount of counter space. In a kitchen with limited counter space, the space occupied by the countertop cooking system when not in use is inconvenient for the user. As a result, a user may store the countertop cooking system elsewhere, reducing the accessibility and ease of use of the countertop cooking system. It is therefore desirable to develop a countertop cooking system that occupies minimal counter space when not in use.

SUMMARY

According to an embodiment, a cooking system positionable on a support surface including a housing having an internal heating compartment and an opening formed in said housing for accessing said internal heating compartment. The housing is movable between a first position and second position. The opening is arranged within a first plane when said housing is in said first position, and the opening is arranged within a second plane when said housing is in said second position, said first plane and said second plane being distinct.

According to an embodiment, a cooking system mountable on a support surface includes a housing having an internal heating compartment and an opening formed in said housing for accessing said internal heating compartment. A swivel structure is arranged at an exterior of said housing, said swivel structure defining a swivel axis. The housing is rotatable about said swivel axis between a first position and a second position.

According to another embodiment, a cooking system includes a housing having a plurality of sides that define an internal heating compartment, a first opening formed in said housing for accessing said internal heating compartment, and a second opening formed in said housing for accessing said internal heating compartment. The first opening is located at a first side of said plurality of sides, and the second opening being located at a second side of said plurality of sides. A cleaning door is movable relative to said housing to selectively seal said second opening.

According to yet another embodiment, A method of accessing an internal heating compartment of a cooking system includes moving a housing defining the internal heating compartment from a first position to a second position, said housing having a first opening located at a first side of said housing and opening a cleaning door arranged in overlapping arrangement with a second opening located at a second side of said housing to access the internal heating compartment.

According to an embodiment, a cooking system includes a housing having a plurality of sides that define an internal heating compartment and a first opening formed in said housing for accessing said internal heating compartment. The internal heating compartment includes structures positioned and included in said heating compartment to optimize heat distribution therein. The structures include at least one of a reflector, at least one heating element with a varying heat output along a length thereof, and at least one heating element guard with a desirable aperture distribution along a length thereof.

According to yet another embodiment, a method of operating a cooking system includes providing a housing having a plurality of sides that define an internal heating compartment and optimizing heat distribution within said internal heating compartment via one or more structures positioned and included in said heating compartment to optimize heat distribution therein. The structures include at least one of a reflector, at least one heating element with a varying heat output along a length thereof, and at least one heating element guard with a desirable aperture distribution along a length thereof.

BRIEF DESCRIPTION OF THE FIGURES

The accompanying drawings incorporated in and forming a part of the specification embodies several aspects of the present disclosure and, together with the description, serves to explain the principles of the disclosure. In the drawings:

FIG. 7A is a schematic diagram of a cooking system in a first, active configuration according to an embodiment;

FIG. 7B is a schematic diagram of the cooking system of FIG. 7A in a second, stowed configuration according to an embodiment;

FIG. 8 is a schematic diagram of an interface between the swivel support and the housing of the cooking system according to an embodiment;

FIG. 14A is a perspective view of a heating element guard according to an embodiment;

FIG. 14B is a plan view of the heating element guard of FIG. 14A according to an embodiment;

FIG. 15A is a perspective view of a heating element guard according to an embodiment;

FIG. 15B is a plan view of the heating element guard of FIG. 14A according to an embodiment;

Figure 1:
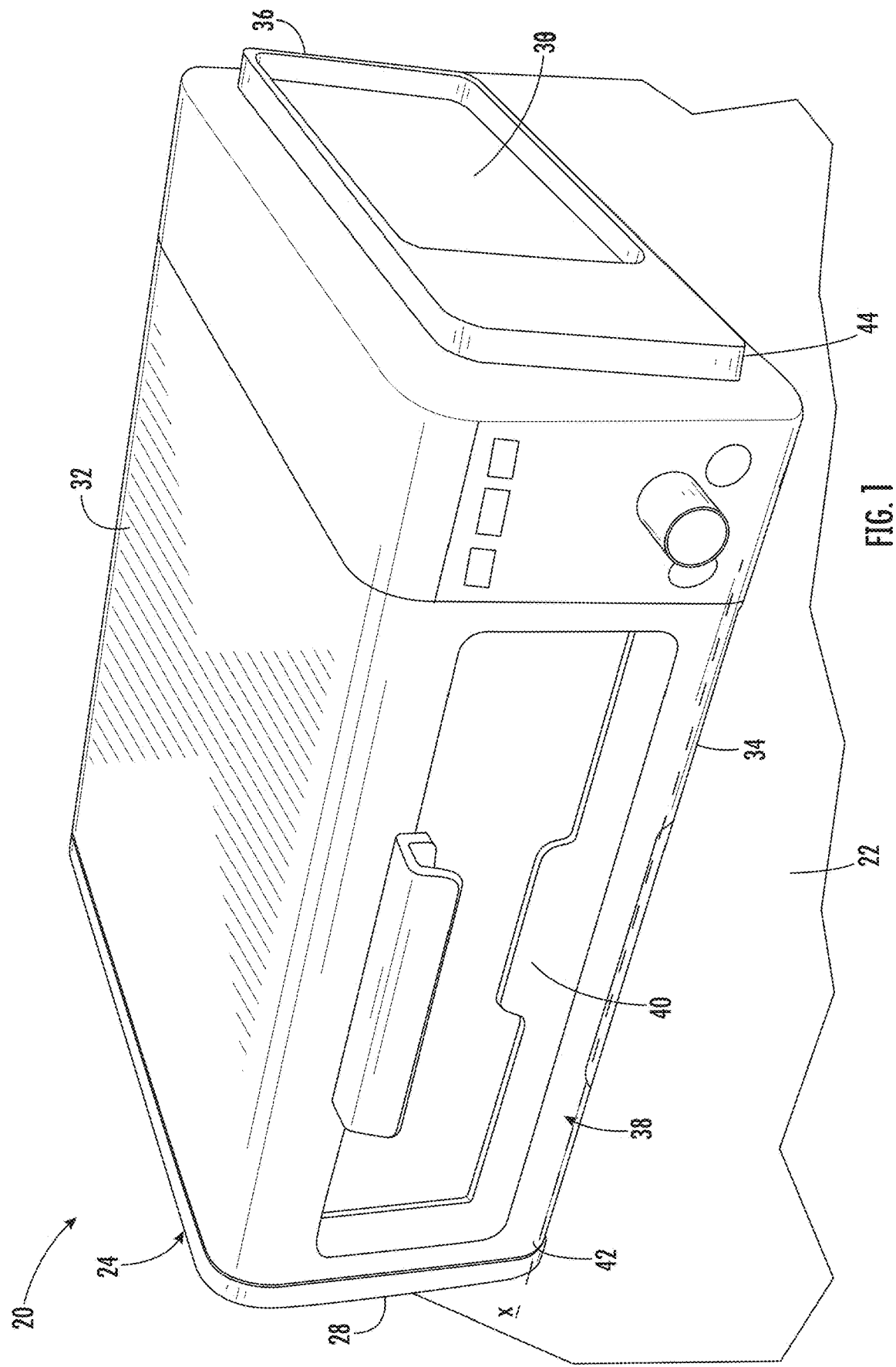
FIG. 1 is a front perspective view of a cooking system according to an embodiment.

The detailed description explains embodiments of the disclosure, together with advantages and features, by way of example with reference to the drawings.

DETAILED DESCRIPTION

With reference now to the FIGS., an example of a cooking system 20 suitable for use on a support surface 22, such as a countertop for example, is illustrated. The cooking system 20 includes a thermally insulated housing 24 that defines an internal heating compartment or cooking volume 26. In the illustrated, non-limiting embodiment, the housing 24 includes a left sidewall 28, a right sidewall 30, a top 32, a bottom 34, and a back or rear wall 36 connected together to define the internal heating compartment 26 there between. In an embodiment, the housing 24 additionally includes a front wall 38 through which the internal heating compartment 26 is accessed by a user. However, it should be understood that embodiments where the housing 24 does not include a front wall 38 are also within the scope of the disclosure.

Figure 2:
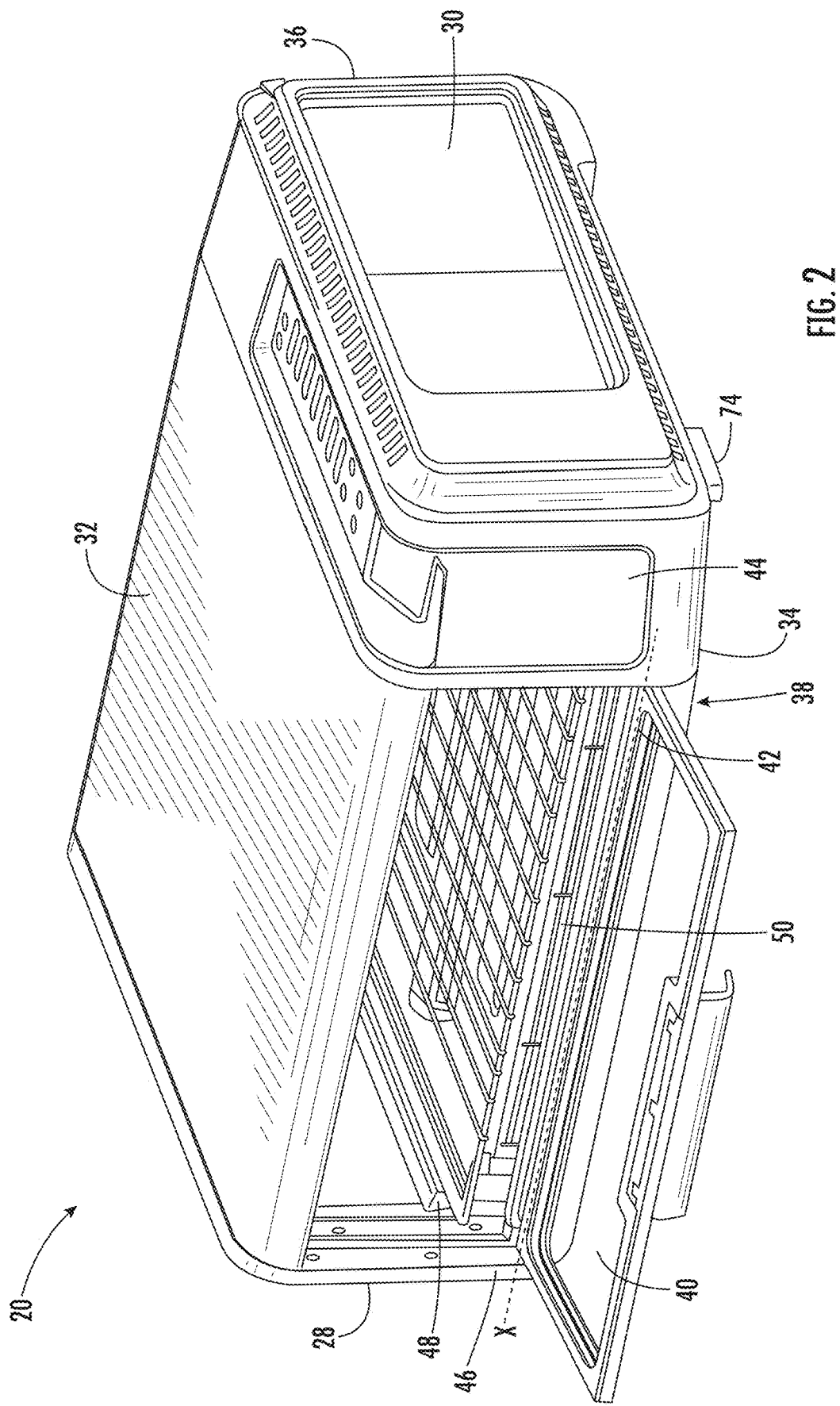
FIG. 2 is a front perspective view of a cooking system with a door in an open position according to an embodiment.

The front wall 38 of the housing 24 may include a door 40 that is movable relative to the remainder of the housing 24 to selectively provide access to the internal heating compartment 26. As shown in the illustrated, non-limiting embodiment, the door 40 includes a transparent panel and is hinged along an edge thereof for rotation about a hinge axis X between an open position (FIG. 2) and a closed position (FIG. 1). Although the hinge axis X is illustrated as being located at a bottom edge 42 of the door 40, embodiments where the hinge axis X is defined at an upper edge or a side edge of the door 40 are also within the scope of the disclosure. Further, although the door 40 is described as being pivotable about a hinge axis X, it should be understood that embodiments where the door 40 is configured to translate relative to the housing 24, or where the door 40 is removably coupled to the housing 24 are also contemplated herein.

In some embodiments, the door 40 may define the entire front wall 38 of the housing 24. However, in other embodiments, the door 40 may define only a portion of the front wall 38, and the front wall 38 may further include a panel 44 located adjacent to one or more sides of the door 40. As shown, the panel 44 may extend between the left and right sidewalls 28, 30, respectively, and between the top and bottom 32, 34, respectively of the housing 24. In such embodiments, an opening 46 (best shown in FIG. 2) for providing access to the internal heating compartment 26 of the housing 24 is formed in the panel 44 and the door 40 is mounted in overlapping arrangement with the opening 46. It should be understood that embodiments where the front wall 38 of the housing 24 includes only a panel 44 and no door 40 are also within the scope of the disclosure.

Figure 3:
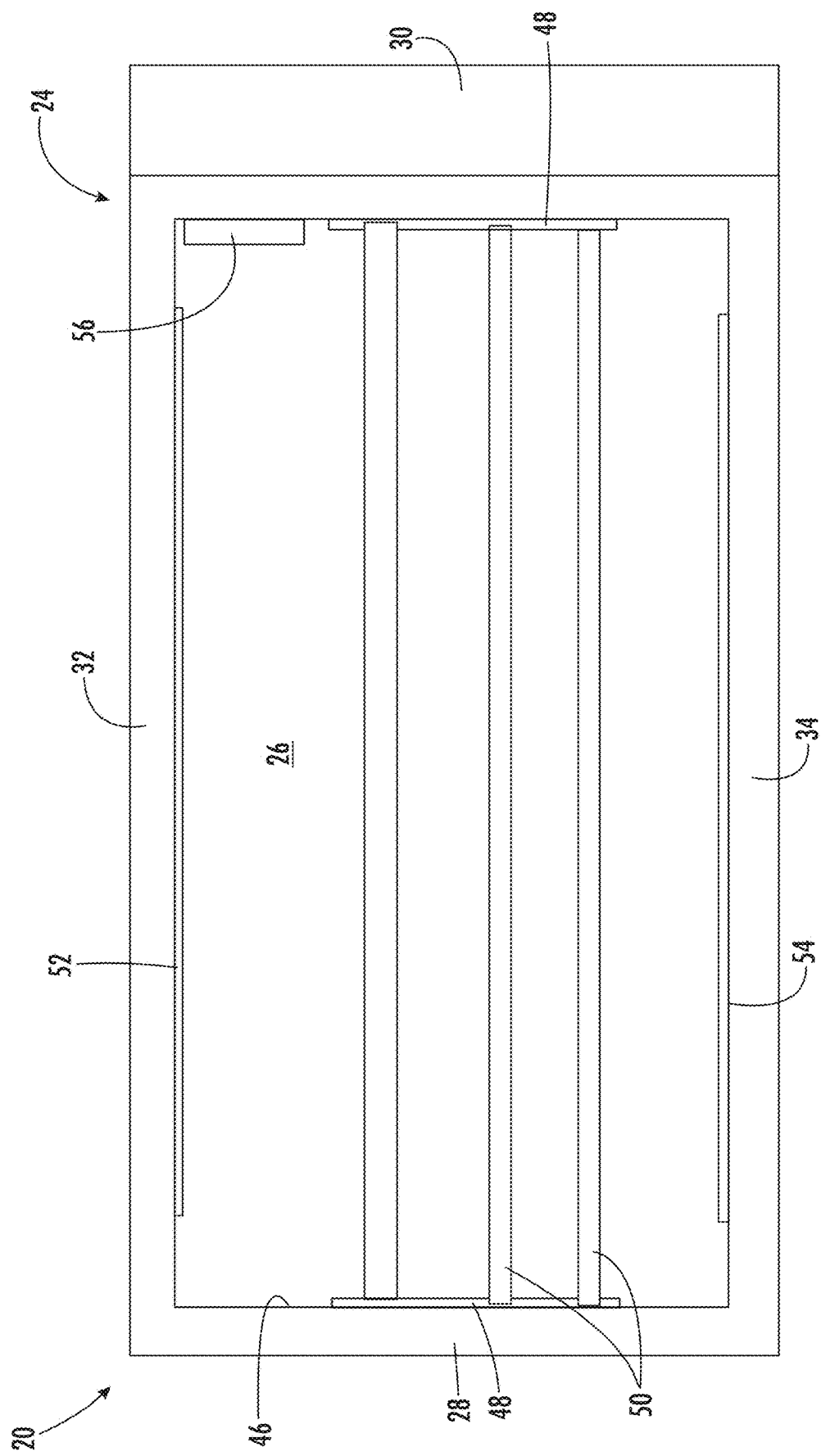
FIG. 3 is a schematic diagram of a cooking system according to an embodiment.

With reference now to FIG. 3, mounted within the internal heating compartment 26 of the housing 24 is at least one fixture 48. In the illustrated, non-limiting embodiment, a pair of opposing fixtures 48 are mounted to an interior surface of the left sidewall 28 and the right sidewall 30, respectively. The one or more fixtures 48 are positioned to support one or more cooking accessories 50, such as a removable cooking rack, basket, spit, or drip tray for example, at a desired position within the internal heating compartment 26.

The internal heating compartment 26 of the housing 24 is heated by at least one heating element. In an embodiment, the cooking system 20 includes one or more first heating elements 52 positioned within the internal heating compartment 26, for example adjacent the top 32 of the housing 24. In the illustrated, non-limiting embodiment, the cooking system 20 includes a plurality of first heating elements 52, such as three first heating elements for example, oriented generally parallel to the hinge axis and spaced across a depth of the top 32 of the housing 24. It should be understood that any number of first heating elements 52 and any configuration of the first heating elements 52 are contemplated herein. Alternatively, or in addition, at least one second heating element 54 may be positioned within the internal heating compartment 26, for example adjacent the bottom 34 of the housing 24. In the illustrated, non-limiting embodiment of FIG. 10-11, the cooking system 20 includes a plurality of second heating elements 54, such as three second heating elements for example, oriented generally parallel to the hinge axis and spaced across a depth of the bottom 34 of the housing. The first heating elements 52 and the second heating elements 54 may be generally aligned, or may be staggered relative to one another.

It should be understood that although the heating elements 52, 54 of the cooking system 20 are illustrated and described as being positioned generally adjacent the top 32 and bottom 34 of the housing 24, embodiments where the cooking system 20 alternatively or additionally includes one or more heating elements (not shown) located adjacent a side of the internal heating compartment 26, or within a center of the internal heating compartment 26 are also contemplated herein.

The one or more heating elements 52, 54 of the cooking system 20 may be selected to perform any suitable type of heating, including but not limited to, conduction, convection, radiation, and induction. Accordingly, the at least one heating element 52, 54 may be any type of heating element, such as a tubular, quartz, tungsten, and halogen heating element. It should be understood that in embodiments of the cooking system 20 having a plurality of heating elements 52, 54 arranged at multiple locations within the internal heating compartment 26, the plurality of heating elements 52, 54 may be substantially identical, or alternatively, may be different, and further may be operable to perform similar or distinct types of heating. In an embodiment, both the first and second heating elements are radiant heating elements. However, heating elements operable to perform other combinations of heating are contemplated herein. Further, in some embodiments, the cooking system 20 may additionally include a fan 56 operable in conjunction with or independently of the heating elements 52, 54 to circulate air or another fluid through the internal heating compartment 26.

With reference to FIGS. 12-16, the configuration of the internal heating cavity 26 of the cooking system 20 may be selected to optimize the heat distribution therein via one or more structures positioned and included therein. This optimization may be implemented in various ways. In an embodiment, the cooking system 20 includes a reflector 110 located within the internal heating cavity 26 and configured to redirect a portion of the heat emitted from a plurality of heating elements, such as the first heating elements 52 for example, to achieve an even heat distribution throughout the internal heating cavity 26. In an embodiment, the reflector 110 has a width and depth generally equal to the internal heating cavity 26. However, embodiments, where the reflector 110 is smaller than the internal heating cavity are also contemplated herein.

The reflector 110 may be made from any suitable material and has surface properties such that at least a portion, if not all, of the heat or light that contacts the surface of the reflector 110 bounces of the surface and is redirected within the internal heating compartment 26. In the illustrated, non-limiting embodiment of FIGS. 12 and 13, the reflector 110 has a corrugated configuration, including a plurality of top flanges 112 and a plurality of bottom flanges 114 coupled by angled surfaces 116. The angles surfaces 116 extending between adjacent upper and lower surfaces 112, 114 may be similar, or alternatively, may be different. The plurality of upper surfaces 112 may be arranged within a first plane U and the plurality of bottom flanges 114 may be arranged within a second plane B, as shown. The first plane U and the second plane B may, but need not be parallel to one another. In an embodiment, the first plane and the second plane are offset by a distance generally equal to a height of the first heating element 52. The plurality of first heating elements 52 are generally arranged within an opening 118 defined between the plane U of the upper surfaces 112 and the plane B of the lower surfaces 114, adjacent an upper flange 114.

Figure 11:
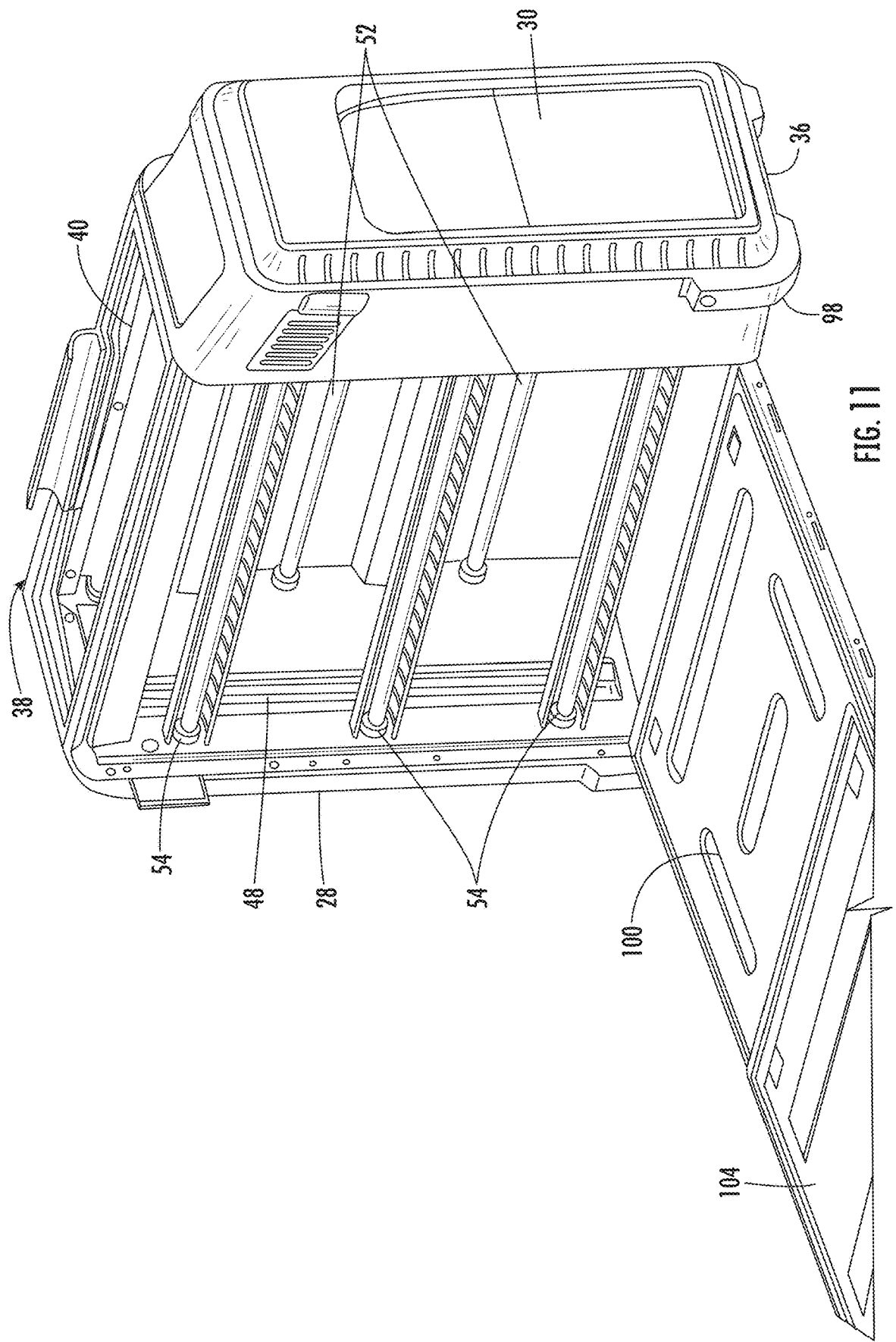
FIG. 11 is a perspective view of a cooking system in a second stowed configuration with a cleaning door in an open configuration and an interior liner of the internal heating compartment partially removed according to an embodiment.
Figure 12:
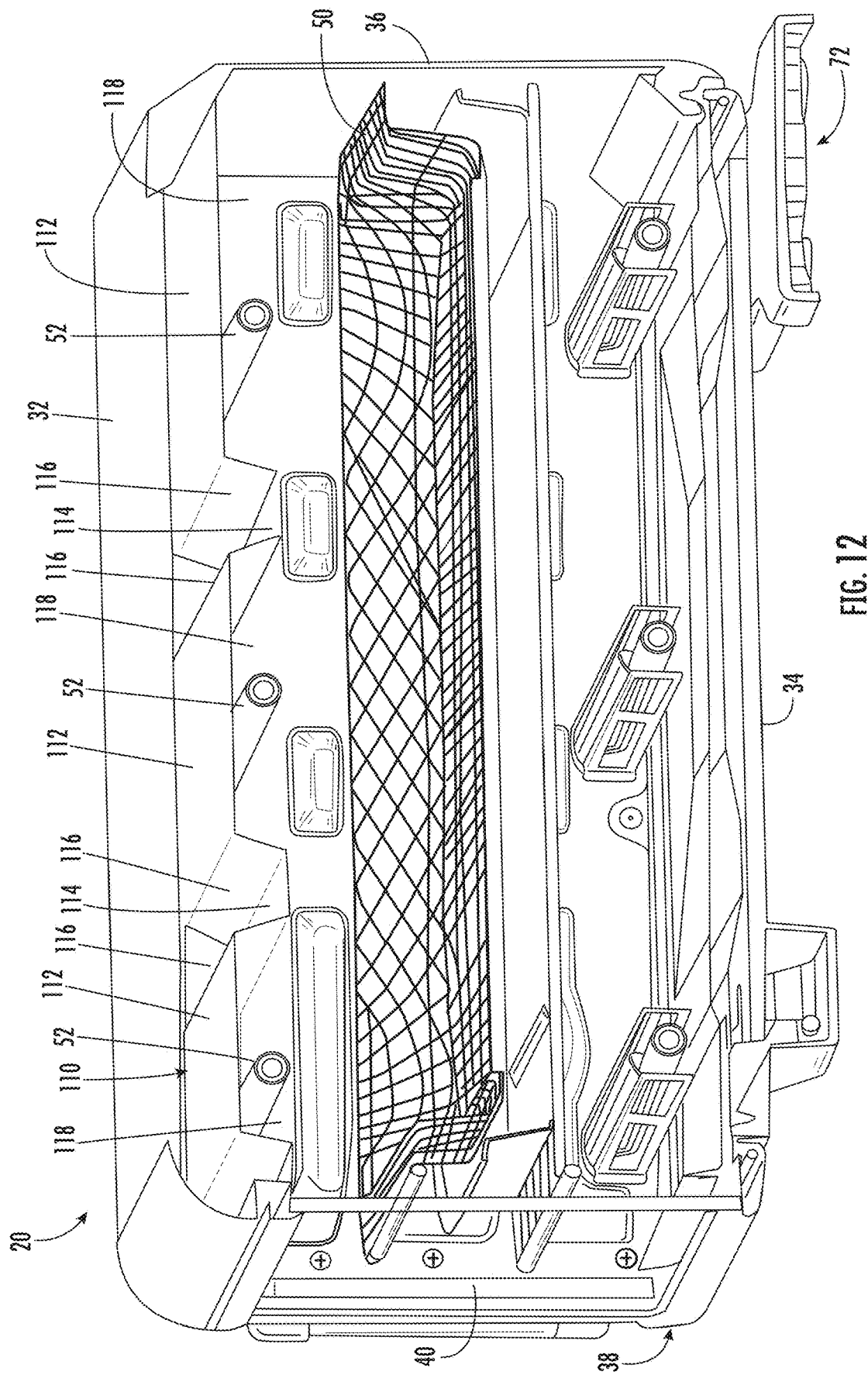
FIG. 12 is a perspective cross-sectional view of a cooking system according to an embodiment.
Figure 13:
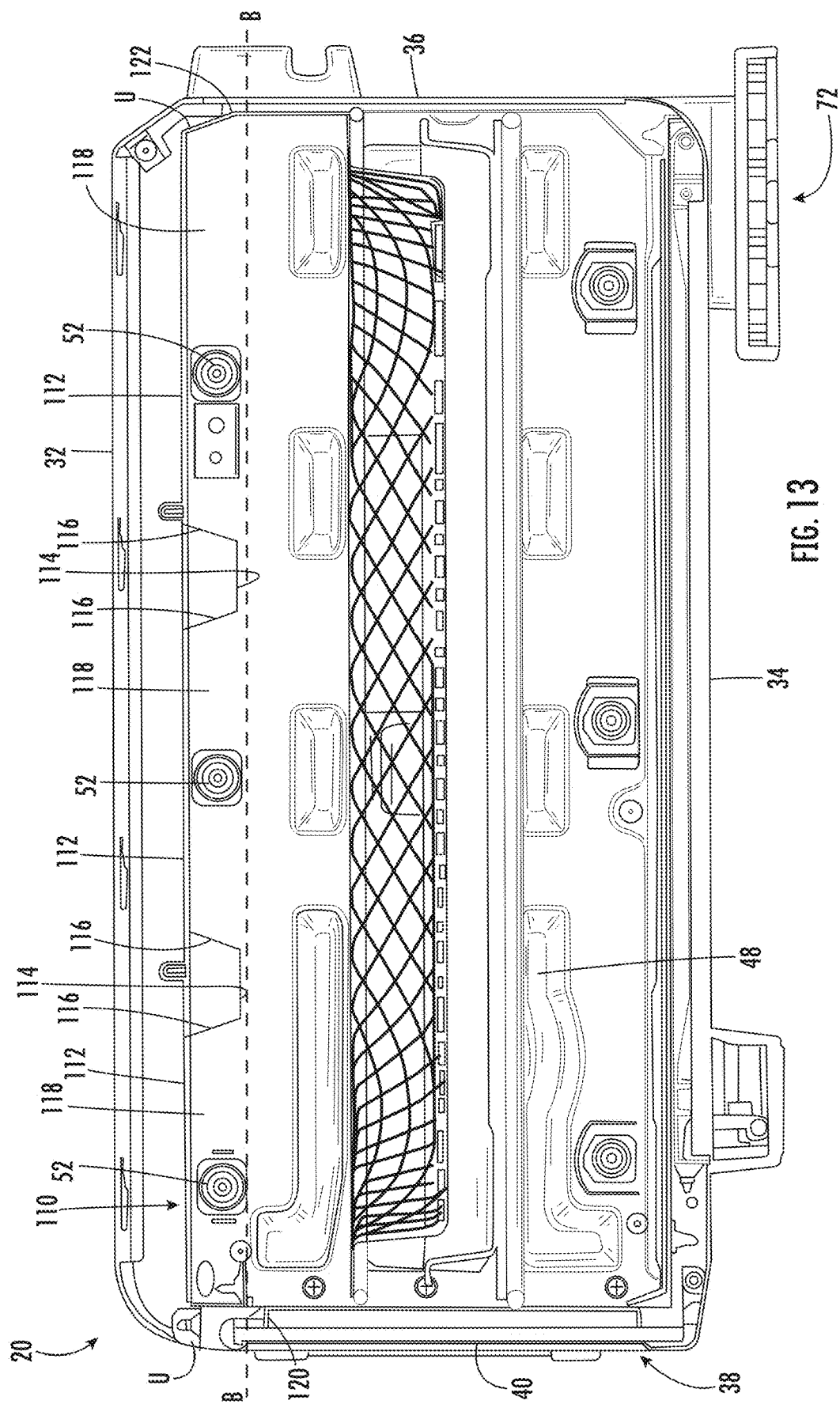
FIG. 13 is a perspective cross-sectional view of a cooking system according to an embodiment.
Figure 16:
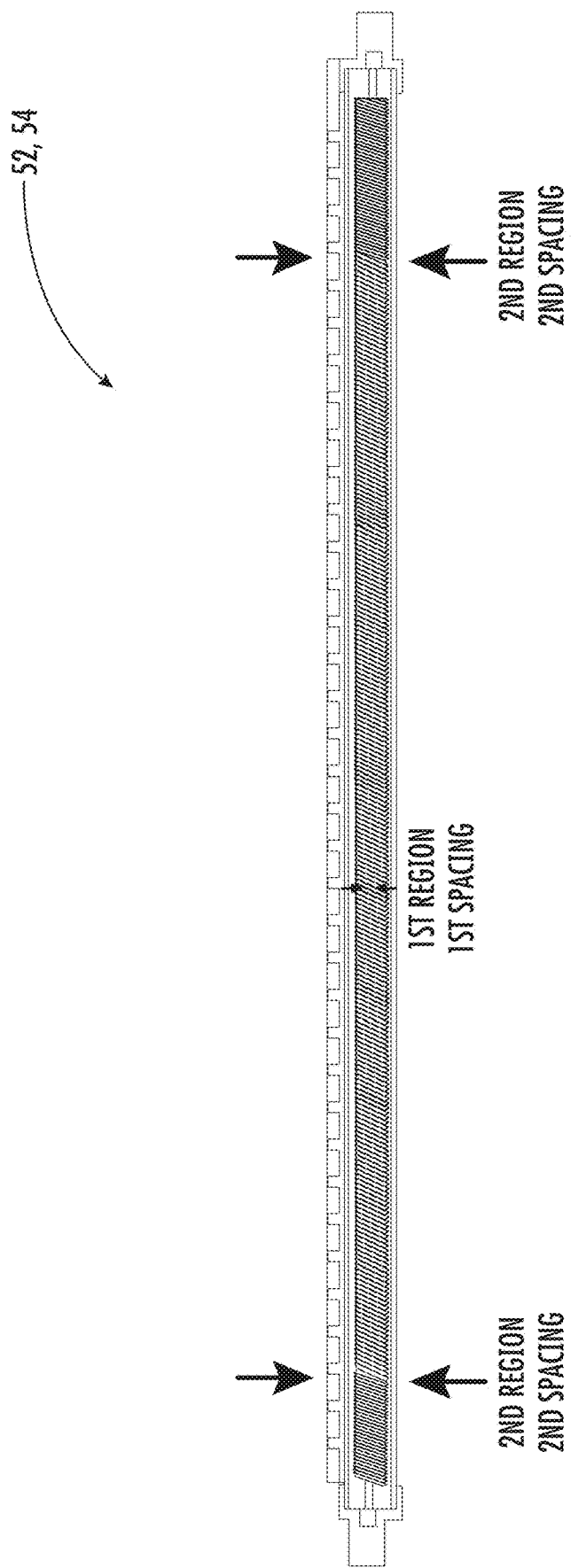
FIG. 16 is a schematic diagram of a heating element according to an embodiment.

Depending on the position of the heating element 52 within the internal heating compartment 26, the depth of the upper flange 112 associated with each heating element 52 and the location of the heating element 52 relative to the upper flange 114 may vary. As shown, the depth of the upper flange 114 adjacent the rear wall 36 is greater than the depth of the upper flange 114 at a center of the internal heating compartment 26, which is greater than the depth of the upper flange 114 adjacent the front wall. Similarly, the heating element 52 located adjacent the front wall 38 is offset from a center of the corresponding upper flange 114, in a direction toward the front wall 38. The central heating element 52 is generally centered relative to the corresponding upper flange 114, and the heating element 52 adjacent the rear wall 36 is similarly offset from a center of the corresponding upper flange 114, for example in a direction toward the front wall 38. In an embodiment, a first end of the reflector 120 extending to the front wall 38 includes a partial bottom flange 114, and the second, opposite end 122 of the reflector 110 abuts the rear wall 36 via a downwardly angled surface extending from an upper flange 112. An example of a model of the heat distribution achieved using a contoured reflector as shown in FIGS. 11 and 12, is illustrated in FIGS. 17 and 18.

Alternatively, or in addition, the heat distribution within the internal heating compartment 26 may be controlled by including one or more guard elements 124 in overlapping arrangement with the heating elements, such as the second heating elements 54 for example. As shown, each guard 124 includes a body 126 extending around at least three sides of a heating element 54. One or more openings 128 are formed in the body 126 to allow heat emitted by the heating element 54 to transmit into the internal heating compartment 26. In an embodiment, the configuration of the openings 128 formed in each of the guard bodies 126 varies based on the position of a corresponding heating element 54 within the internal heating compartment 26. The configuration of the openings 128 may similarly vary over the length of each heating element 54. An example of a guard 124 for use with a heating element 54 positioned adjacent the front wall 38 is illustrated in FIGS. 14A-14B. As shown, a plurality of large openings 128 extend generally uniformly over multiple sides of the body 126. Because heat within the internal heating compartment 26 is lost through opening formed in the front wall 38, the guard 124 for the heating element 54 arranged adjacent the front wall 38 allows more heat to pass there through than the guards 124 coupled to the heating elements 54 arranged at the center of the internal heating compartment 26 and adjacent the rear wall 36.

An example of a guard 124 for use with a heating element 54 arranged at a center of the internal heating compartment 26, or alternatively, adjacent the rear wall 36, is illustrated in FIGS. 15A-15B. As shown, the body 124 includes a plurality of smaller openings 128 formed over an upper surface of the body 124. Further, the density of the openings 128 varies over the length of the body 124. In the illustrated, non-limiting embodiment, a greater number of openings 128 are formed adjacent the ends 130, 132 of the body 124 and therefore the ends of the heating elements 54, than at the center of the heating element 54. This reduced number of openings 128 adjacent the center of the guard 124 is intended to reduce the heat emitted from a center of the central and rear heating elements 54. Accordingly, the openings 128 formed in the guards 124 are intended to control the distribution of the heat emitted by the heating elements 54 between the front and real walls 38, 36, and between the left and right sidewalls 28, 30 that define the internal heating compartment 26.

Figure 17:
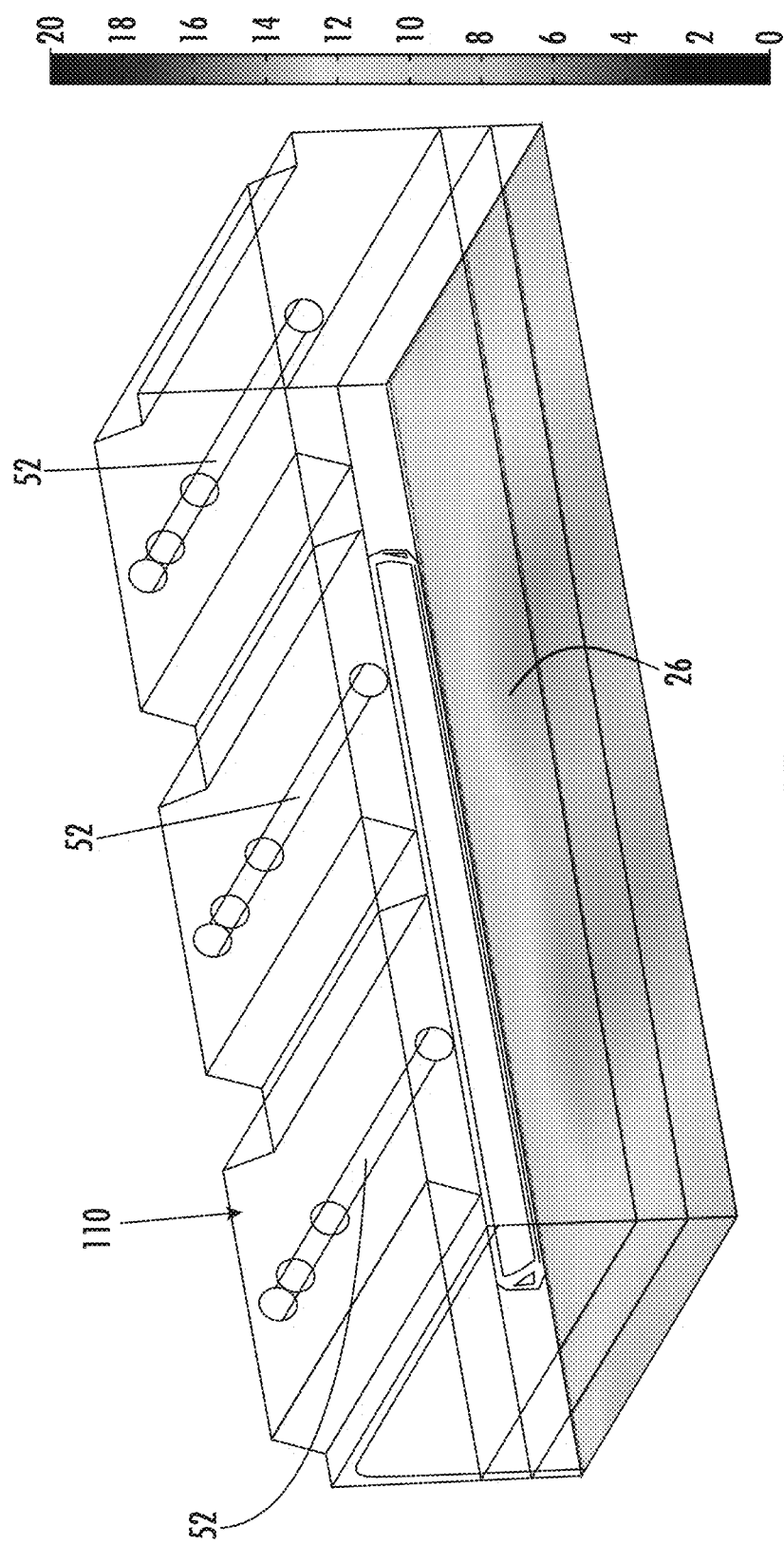
FIG. 17 is a perspective model of the heat distribution within the internal heating compartment of the cooking system according to an embodiment.
Figure 18:
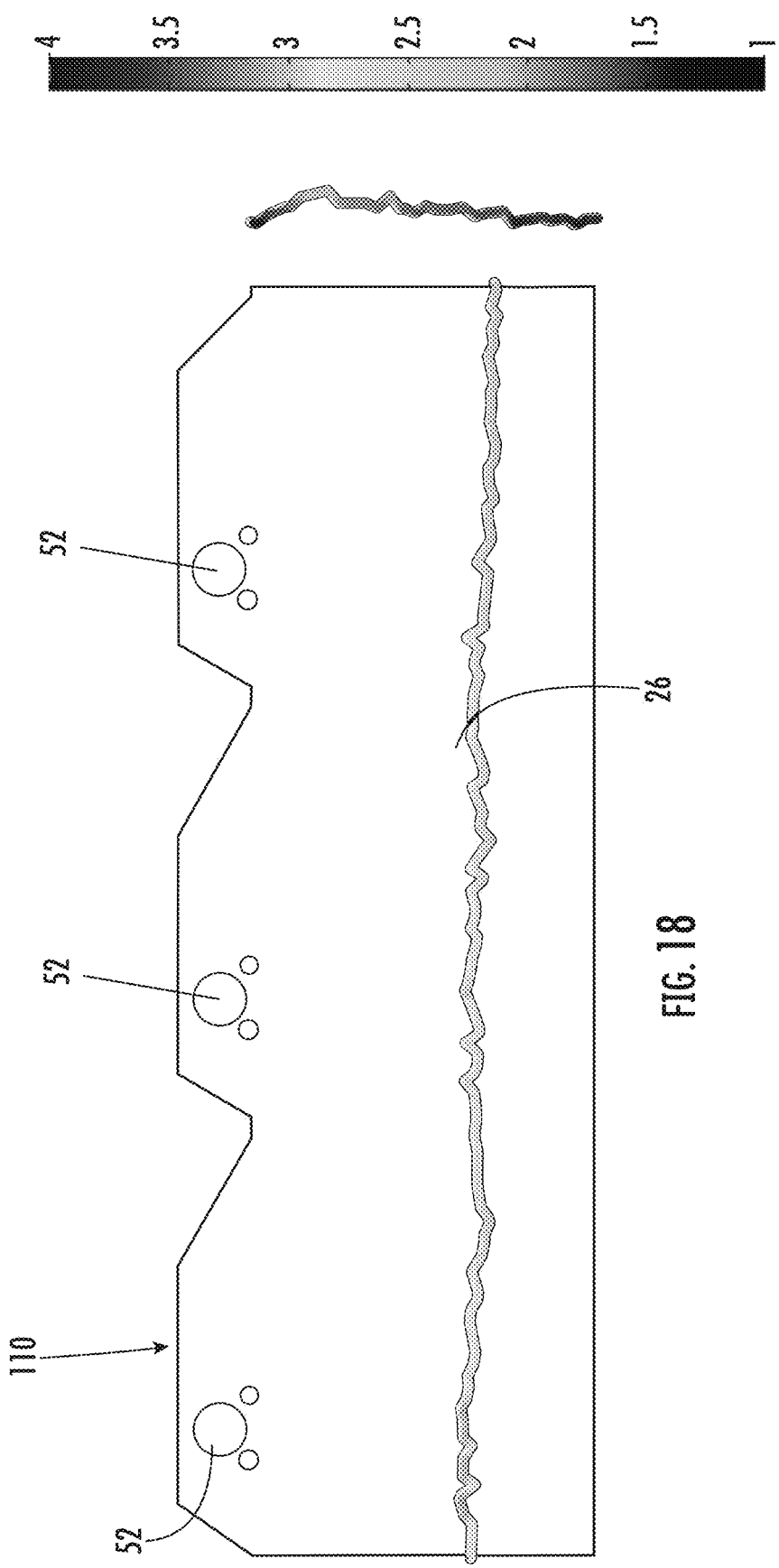
FIG. 18 is a model of a cross-section of the heat distribution within the internal heating compartment of the cooking system according to an embodiment.

Further, with reference to FIG. 17, in an embodiment, the heat output across one or more of the heating elements 52, 54 may vary. In an embodiment, one or more of the heating elements 52, 54 is constructed using coiled wire arranged within a tube which heats and emits radiation when power is supplied thereto. By varying the spacing between adjacent coils over the length of the heating element 52, 54, the amount of heat emitted at various portions of the heating element 52, 54 may be greater than others. In the illustrated, non-limiting embodiment, the heating elements 52, 54 are configured such that the spacing of the wire coils within a first region of the heating element 52, 54, such as the center of the heating element 52, 54 for example, is wider than the coil spacing within a second region of the heating element 52, 53, such as adjacent the ends of the heating element 54. For example, the coil within the first 12.5% of the length of the heating element 52, 54 may have a first coil spacing, the next 75% of the heating element 52, 54 may have a second coil spacing, and the final 12.5% of the heating element 52, 54 may also be constructed with the first coil spacing. Further, the construction of the first and second heating elements 52, 54 may be distinct. In an embodiment, one or more of the plurality of first heating elements 52 has a first coil spacing equal to 1.25 times the second coil spacing and one or more of the plurality of second heating elements 54 has a first coil spacing equal to 1.5 times the second coil spacing. It should be understood that a heating element 52, 54 having more than two areas of distinct coil spacings, and different ratios of the coil spacings are also contemplated herein.

Figure 4:
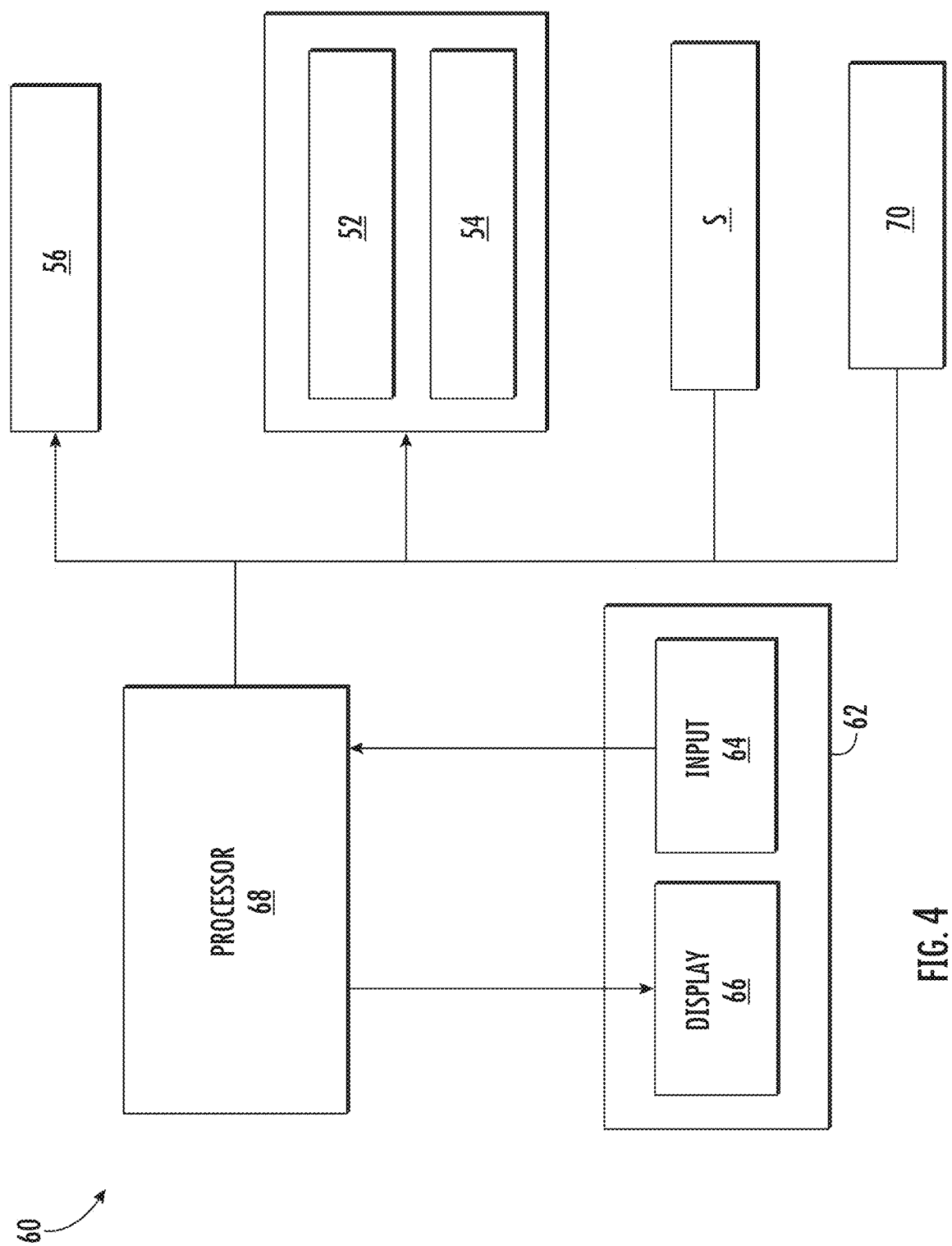
FIG. 4 is a schematic diagram of a control system of a cooking system according to an embodiment.
Figure 5:
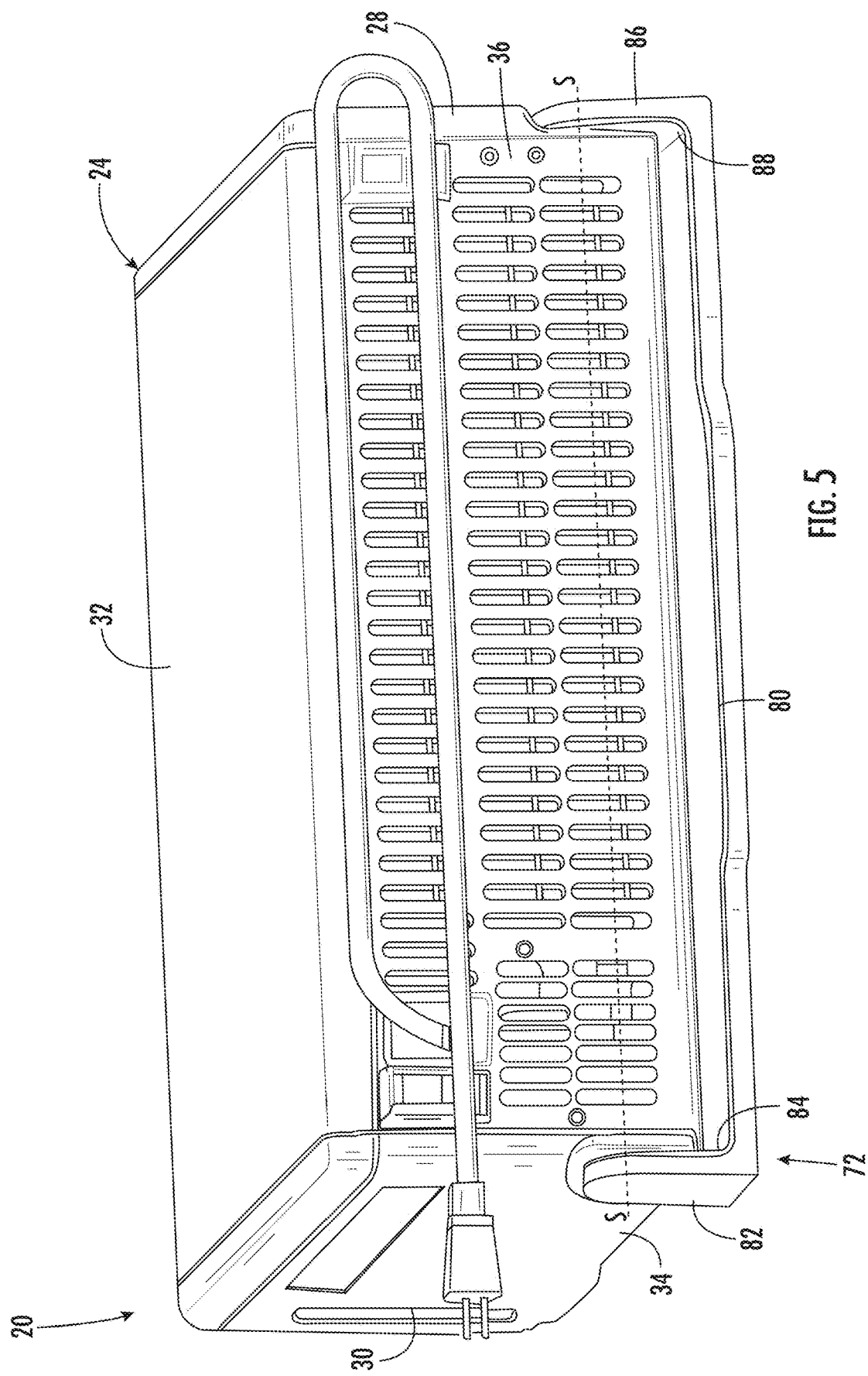
FIG. 5 is a rear perspective view of a cooking system according to an embodiment.

With reference now to FIG. 4, a control panel or user interface 62 for operating the cooking system 20 is mounted to an exterior portion of the housing 24, for example the panel 44 or the top. The control panel 62 is part of a control system 60 that is electrically connected to the one or more heating elements 52, 54. The control panel 62 includes one or more inputs 64 associated with energizing the one or more heating elements 52, 54 of the cooking system 20 and for selecting various modes of operation of the cooking system 20. One or more of the inputs 64 may include a light or other indicator to show that the respective input 64 has been selected. The control panel 62 may additionally include a display 66 separate from and associated with the at least one input 64. However, embodiments where the display 66 is integrated into the at least one input 64 are also contemplated herein.

Operation of the one or more inputs 64 will be described in more detail below. As shown in FIG. 4, the control system 60 includes a controller or processor 68 for controlling operation of the heating elements 52, 54 in response to a user input provided via the one or more inputs 64 and for using algorithms to execute stored sequences of heating operation. In embodiments where the cooking system 20 includes a plurality of heating elements 52, the heating elements 52, 54 may be independently operable. Further, the heating output of one or more of the heating elements 52, 54 may be variable in response to the power supplied to the heating elements 52, 54. The control system 60 may include one or more sensors S arranged in communication with the processor 68 and operable to monitor one or more parameters, for example temperature within the internal heating compartment 26.

In an embodiment, at least one input 64 on the control panel 62 is an on/off button which allows the user to activate or deactivate the control panel 62. When the control panel 62 is deactivated, none of the heating elements 52, 54 are energized. In an exemplary embodiment, the at least one input 64 is operable to select one or more manual modes of operation of at least one of the heating elements 52, 54. Alternatively, or in addition, at least one input 64 is operable to select a stored sequence of operation of at least one heating element 52, 54. In some cases, the stored sequences may be particularly well suited for a given method of food preparation and/or for particular ingredients or types of ingredients. The plurality of stored sequences associated with the at least one input 64 may be stored within a memory accessible by the processor 68. Alternatively, the plurality of stored sequences may be stored remotely from the cooking system 20, and may be accessed by the processor 68, such as via wireless communication for example.

In addition, a user may be able to enter or select a time associated with operation of the cooking system 20 in a desired manual mode. The time may be entered via the same input 64, or a separate input 64 as used to select a mode of operation. Further in embodiments where the cooking system 20 is in a mode configured to perform a stored sequence in response to selection of one of the inputs, the display 66 may indicate a time remaining on the display 66. Temperature or other parameters, such as toasting color for example, may also be entered via inputs 64.

The at least one input 64 may include a distinct start button intended to initiate operation in a desired mode, a distinct stop button to cease all operation, or a stop/start button intended to initiate and cease functions. Alternatively, the cooking system 20 may be operable to automatically start operation after a predetermined time has elapsed once an input has been selected and any necessary information has been provided to the control panel 62. One or more of the other inputs 64, such as a knob for example, may be operable, such as by pushing the knob towards the control panel 62, to start and stop operation of the cooking system 20, regardless of whether the cooking system 20 is following a stored sequence or is in a manual mode.

The one or more inputs 64 are operable to initiate operation of the cooking system 20 in a plurality of cooking modes. Examples of modes of operation of the cooking system 20 include, but are not limited to, toast, bake, broil, grill, warm, reheat, and steam cook. Independent control of the heating elements 52, 54 allows a user to configure a cooking/heating cycle based on the type of food item positioned within the internal heating compartment 26.

In an embodiment, the housing 24 of the cooking system 20 is movable between a first operational or "active" position (see FIG. 7A) and a second non-operational or "stowed" position (see FIG. 7B). In the first active position, the control system 60 is operable to energize the one or more heating elements 52, 54 and fan 56 of the cooking system 20. When the cooking system 20 in the second stowed position, the one or more heating elements 52, 54 and fan 56 may be prevented from being energized. For example, the cooking system 20 may include a switch, illustrated schematically at 70 in FIG. 4, such that when the cooking system 20 is in the second stowed position, the switch 70 is open, thereby blocking power from being supplied to any of the heating elements 52, 54 and fan 56. However, it should be understood that embodiments where the heating elements 52, 54 and/or fan 56 may be energized when the housing is in the stowed configuration are also contemplated herein.

In the illustrated, non-limiting embodiment, the housing 24 of the cooking system 20 is rotatable about a swivel axis S between the first position and the second position. The swivel axis S is defined by a swivel support 72 coupled to or integrally formed with the housing 24. Accordingly, the swivel support 72 locates at least a portion of the housing 24 relative to the support surface 22. In the first active position, the housing 24 and the internal heating compartment 26 defined therein have a generally horizontally orientation. As shown, in the first active position, at least one of the top 32 and bottom 34 of the housing 24 is arranged generally parallel to support surface 22 on which the cooking system 20 is located, and the front wall 38, including the opening 46 formed therein, is oriented generally perpendicular to the support surface 22. In an embodiment, the cooking system 20 includes one or more first feet 74 extending from the housing 24, such as from the bottom 34 thereof. In such embodiments, the first feet 74 cooperate with the swivel support 72 to position the cooking system 20 on the support surface 22. However, in other embodiments, the housing 24 of the cooking system 20 may be support entirely by the swivel support 72, for example in a cantilevered configuration, when in the first active position.

The cooking system 20 is rotatable about the swivel axis S in a first direction, indicated by arrow A, toward the second stowed position. In an embodiment, the cooking system 20 is rotatable approximately ninety degrees between the first position and the second position. In the second stowed position, shown in FIG. 7B, the housing 24 and the internal heating compartment 26 are oriented generally vertically. In the second stowed position, at least one of the rear wall 36 and the front wall 38 is oriented generally parallel to the support surface 22 and the bottom 34 is oriented perpendicular to the support surface 22. In an embodiment, the cooking system 20 includes one or more second feet 76 extending from the housing 24, such as from the rear wall 36 thereof. In such embodiments, the second feet 76 cooperate with the swivel support 72 to position the cooking system 20 on the support surface 22 in the second stowed position. However, in other embodiments, the housing 24 of the cooking system 20 may be support entirely by the swivel support 72, for example in a cantilevered configuration, when in the second stowed position.

From the stowed position, the housing 24 of the cooking system 20 is rotatable about the swivel axis S in a second direction, indicated by arrow B, toward the first active position. As the housing 24 of the cooking system 20 transforms between the first position and the second position, the front wall 38 and/or the opening 46 or door 40 associated therewith rotates out of plane i.e. from a first plane to a second plane distinct from the first plane. Because the projected surface area of the housing 24 in the second position is substantially smaller than the projected surface area of the housing 24 in the first position, the surface area of the support surface 22 occupied by the cooking system 20 when the cooking system 20 is not in use is minimized.

In an embodiment, the swivel axis S is positioned near an edge of the housing 24. For example, the swivel axis S is shown being located adjacent the back rear corner of the housing 24, near the interface between the bottom 34 and the rear wall 36 of the housing 24. However, it should be understood that embodiments where the swivel axis S is arranged along another edge of the housing 24, such as adjacent the interface between the bottom and a sidewall 28, 30 for example, are also contemplated herein.

Figure 6:
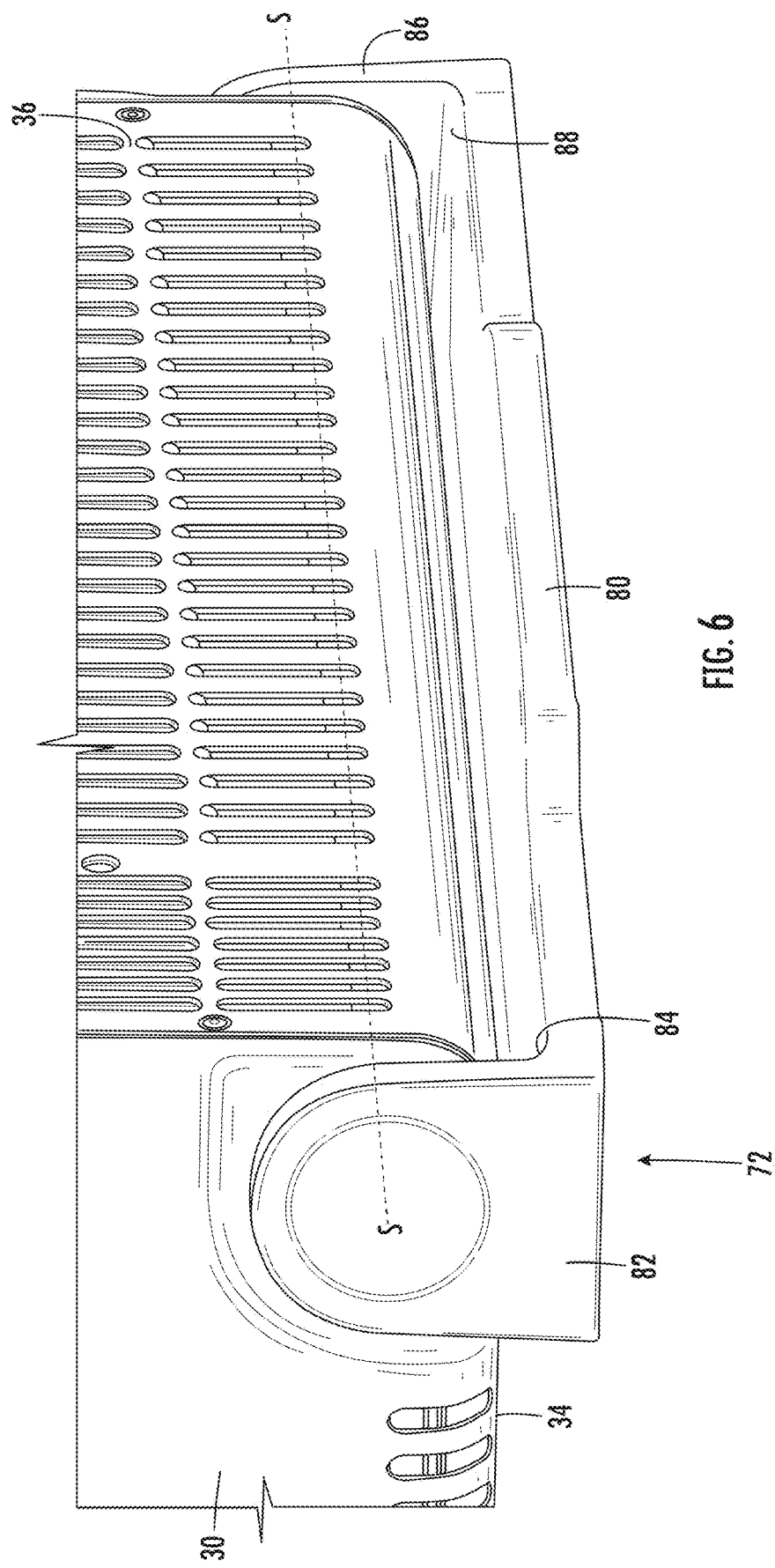
FIG. 6 is a detailed perspective view of a swivel support of a cooking system according to an embodiment.

With reference now to FIGS. 6-8, in the illustrated, non-limiting embodiment, the swivel support 70 includes a base 80 having a first support arm 82 extending from a first end 84 of the base 80 and a second support arm 86 extending from a second end 88 of the base 80. However it should be understood that a swivel support 70 including only a single support arm, or more than two support arms are also within the scope of the disclosure. The first support arm 82 and the second support arm 86 may be integrally formed with the base 80, or alternatively, may be separate components affixed thereto. In the illustrated embodiment, the base 80 has a generally horizontal configuration and the first and second support arms 82, 86 are oriented generally perpendicular to the base 80; however, embodiments where the support arms 82, 86 extend at another angle are also contemplated herein. The base 80 may have a generally rectangular body, less than or equal in surface area to the projected surface area of the housing 24 in the second position. Alternatively, in an embodiment, a depth of the base 80 may vary over a width of the base 80. For example, as best shown in FIG. 6, a depth at the center of the base 80 is larger than the depth at the ends 84, 88 of the base 80. This increased depth may enhance the stability of the cooking system 20 when in the second stowed position.

As best shown in FIG. 8, each of the first support arm 82 and the second support arm 86 includes a pin connector 90 receivable within a corresponding opening 92 formed in a side, such as sidewalls 28 and 30 for example, of the housing 24. In the illustrated, non-limiting embodiment, the pin connectors 90 of the first support arm 82 and the second support arm 86, respectively, are coaxially oriented. Together, the pin connectors 90 cooperate to define the swivel axis S. The pin connectors 90 may directly contact an interior surface of the opening 92, or alternatively, a bearing (not shown) may be located at the interface between the pin connector 90 and the opening 92 to facilitate movement of the housing 24 relative to the pin connectors 90. In an embodiment, the pin connectors 90 and/or the openings 92 may be configured to restrict rotation of the housing 24 about the swivel axis S beyond the first position and the second position. However, the rotation of the housing 24 about the swivel axis S may be controlled or limited via any suitable mechanism.

In an embodiment, the pin connectors 90 are located near a distal end 94 of each of the first and second arms 82, 86. As a result, an adjacent surface of the housing 24, such as the bottom 34 of the housing 24 when in the first position, and the rear wall 36 of the housing 24 when in the second position, is offset from the base 80 and the support surface 22. This clearance 96 defined between the base 80 and the housing 24 allows the housing 24 to freely rotate about the swivel axis S without interference.

Figure 9:
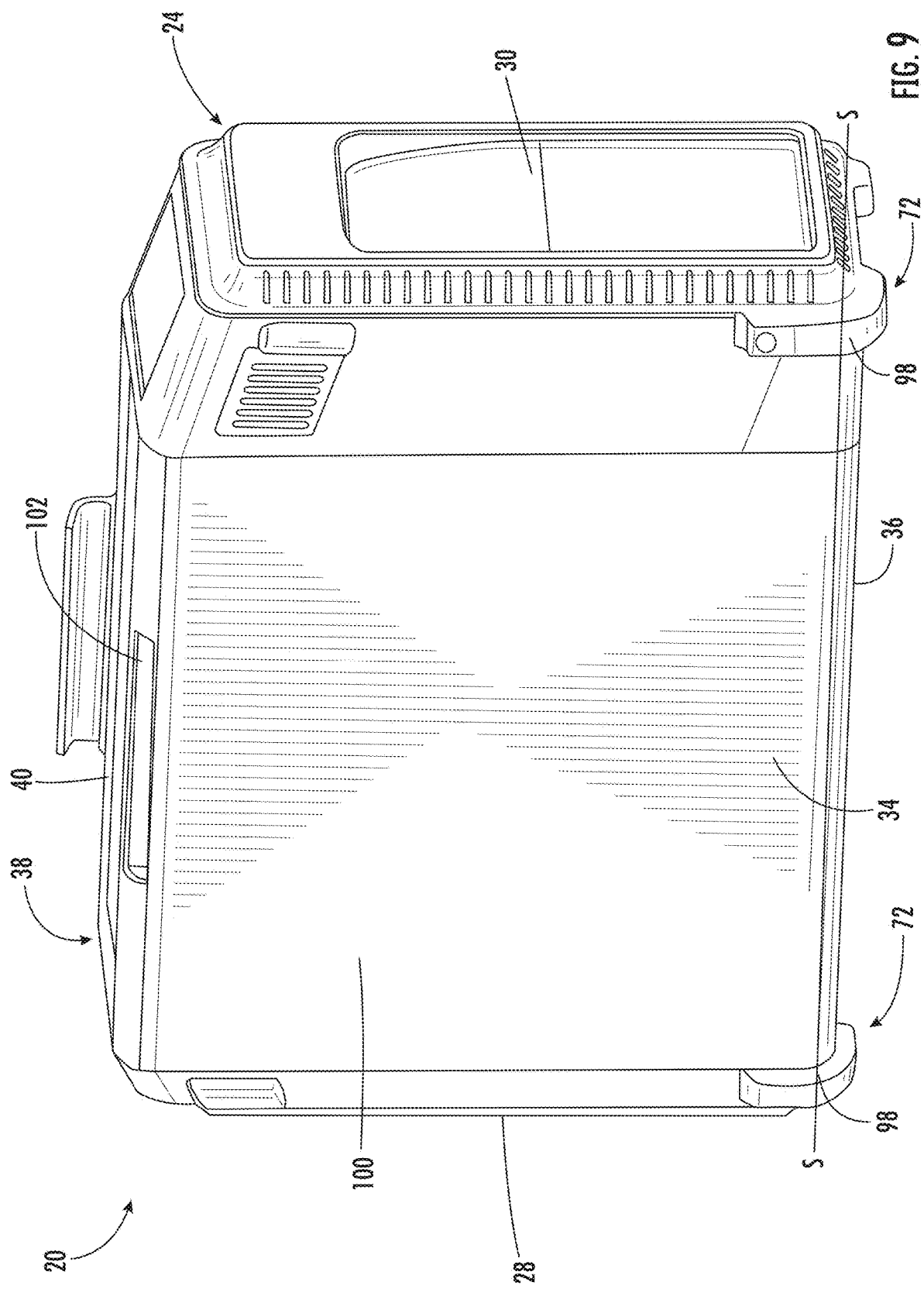
FIG. 9 is a perspective view of a cooking system in a second stowed configuration according to an embodiment.

In another embodiment, best shown in FIG. 9, the swivel support 70 may be a rounded feature arranged at an edge of the housing. However, the rounded feature of the swivel support 72 is distinct from the rounded edges of the housing. In an embodiment, the swivel support 72 includes one or more arcuate features 98, such as ribs for example, located at an exterior surface of the housing 24 and extending between the bottom 34 and the rear wall 36. The origin of each of the arcuate features 98 defines the swivel axis S and the contour of the arcuate features 98 facilitates rotation of the housing 24 by a user between the first position and the second position.

In an embodiment, the cooking system 20 may include a secondary door, distinct from the door 40 or opening 46 associated with the front wall 38 of the housing 24, for accessing the internal heating compartment 26. With continued reference to FIG. 9, and further reference to FIGS. 10-11, in an embodiment, a cleaning door 100 is formed in the housing 24, and more specifically, in the rear wall 36. The cleaning door 100 may extend over a portion of the rear wall 36, or alternatively, may cover a substantial entirety of the rear wall as shown in the FIGS.

Figure 10:
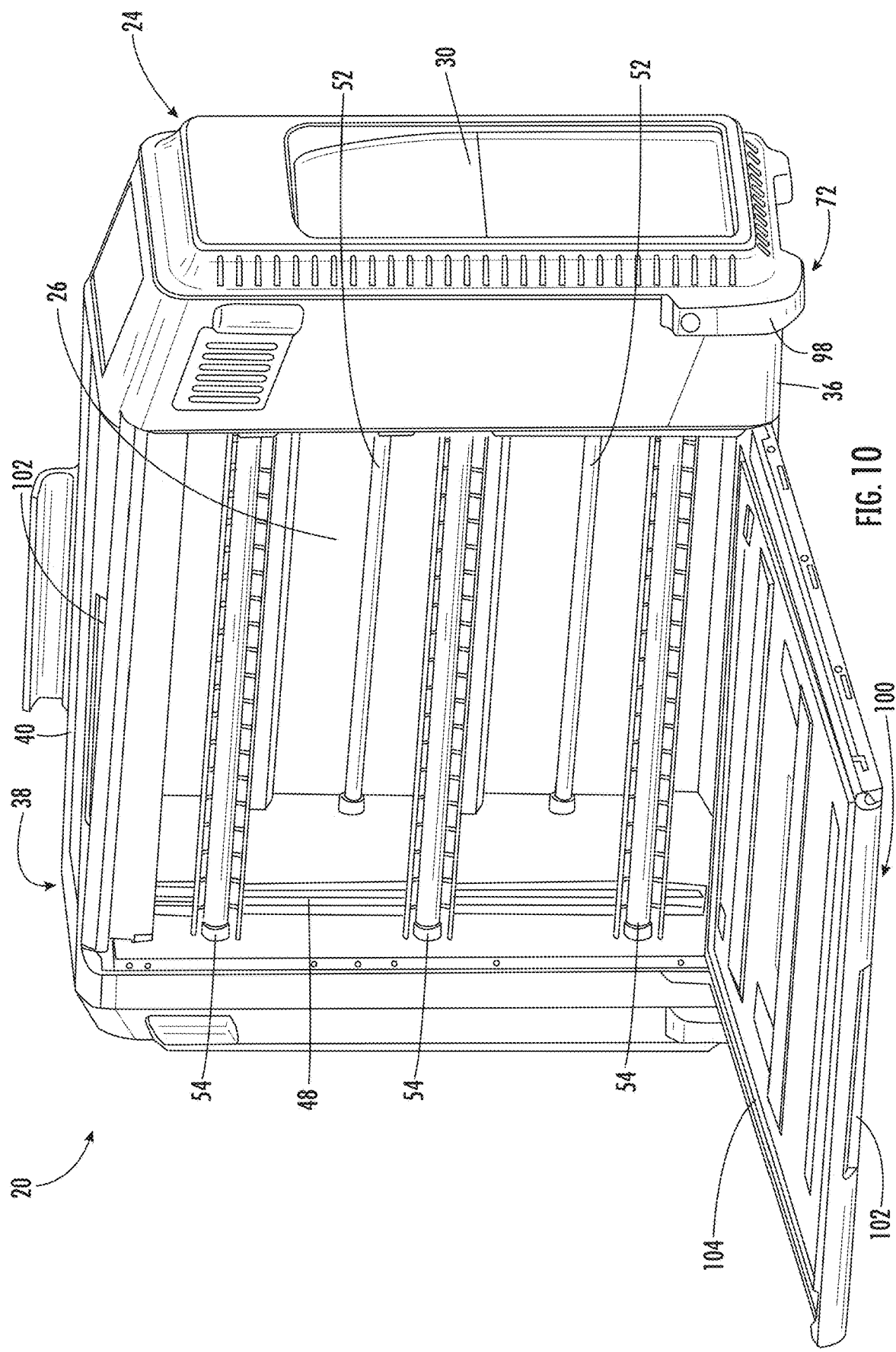
FIG. 10 is a perspective view of a cooking system in a second stowed configuration with a cleaning door in an open configuration according to an embodiment.

When the cooking system 20 is rotated relative to the first position, i.e. the bottom is not arranged parallel to and directly adjacent the support surface 22, the cleaning door 100 is movable between a closed position (FIG. 9) and an open position (FIG. 10). The cleaning door may be able to rotate, translate, separate, or any combination thereof to transform between the closed position and the open position. In an embodiment a latch mechanism, illustrated at least partially at 102, selectively couples the cleaning door 100 to the remainder of the housing 24. Upon application of a force to the latch mechanism, the cleaning door is decoupled from the housing 24 such that the cleaning door 100 is movable between to an open position. When the cleaning door is returned to the closed position, the latch mechanism may be configured to automatically engage and couple to the cleaning door, thereby restricting movement of the cleaning door relative to the housing.

Due to the increased size of the cleaning door relative to the door 40, a user is able to more easily access the internal heating compartment 26 via the cleaning door 100. As a result, removal of one or more components mounted within the internal heating compartment 26, such as a liner 104 positioned in overlapping arrangement with an interior of a portion of the housing 24 for example, is better performed via the cleaning door 100.

The cooking system 20 illustrated and described herein provides an enhanced user experience by reducing the total amount of counter space occupied by the cooking system when the cooking system is not in use.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A cooking system mountable on a support surface, the cooking system comprising:
   a housing having a front wall, first and second sidewalls, a top wall, a bottom wall, and a rear wall connected together to form an internal heating compartment configured to receive food therein, a first opening formed in the front wall of the housing for accessing the internal heating compartment, a second opening formed in the bottom wall of the housing for accessing the internal heating compartment, and a support foot extending from the housing, wherein the housing is rotatable between a first position and a second position;
   a cleaning door selectively positioned over the second opening; and
   a swivel structure arranged at an exterior of the housing and configured to rest on a support surface, the swivel structure defining a swivel axis, wherein the housing is rotatable about the swivel axis between the first position and a second position, wherein the support foot and the swivel structure are configured to rest on the support surface in the first position, and wherein only the swivel structure is configured to rest on the support surface in the second position, the swivel structure being configured to remain stationary relative to the support surface as the housing rotates about the swivel structure from the first position to the second position.

2. The cooking system of claim 1, wherein the first opening is arranged at a first extent of the housing, and the swivel axis is positioned at a location of said housing adjacent a second extent of the housing generally opposite said first opening and the first extent.

3. The cooking system of claim 1, wherein the swivel axis is located where the rear wall meets the bottom wall.

4. The cooking system of claim 1, wherein said swivel structure includes a rounded feature.

5. The cooking system of claim 1, wherein said swivel structure includes an at least one arcuate feature connected to said housing.

6. The cooking system of claim 1, wherein said swivel structure includes a base and at least one support arm connected to said housing, said at least one support arm includes a pin connector defining said swivel axis.

7. The cooking system of claim 1, wherein said first opening is arranged within a first plane when said housing is in said first position and said first opening is arranged within a second plane when said housing is in said second position, said first plane and said second plane being distinct.

8. The cooking system of claim 1, wherein in the first position, the internal heating compartment is oriented generally horizontally, and a plane including the first opening is oriented generally vertically.

9. The cooking system of claim 1, wherein in the second position, the internal heating compartment is oriented generally vertically, and a plane including the first opening is oriented generally horizontally.

10. The cooking system of claim 1, wherein in the first position, the internal heating compartment is oriented generally parallel to the support surface, and in the second position, the internal heating compartment is oriented generally perpendicular to the support surface.

11. The cooking system of claim 1 further comprising a door hingedly connected to the bottom wall and configured to selectively close the first opening.

12. A cooking system mountable on a support surface, the cooking system comprising:
    a housing having a front wall, first and second sidewalls, a top wall, a bottom wall, and a rear wall connected together to form an internal heating compartment configured to receive food therein, a first opening formed in the front wall of the housing for accessing the internal heating compartment, a second opening formed in the bottom wall of the housing for accessing the internal heating compartment, and a support foot extending from a front exterior of the housing and configured to rest on a support surface;
    a cleaning door selectively positioned over the second opening; and
    a swivel structure arranged at a rear exterior of the housing and configured to rest on the support surface, the swivel structure defining a swivel axis, wherein the swivel structure and the support foot are spaced along a distance extending from the front exterior of the housing to the rear exterior of the housing, and wherein the swivel axis is perpendicular to the distance, and wherein the housing is rotatable about the swivel axis between a first position and a second position, the swivel structure configured to remain stationary relative to the support surface as the housing rotates about the swivel structure from the first position to the second position.

13. The cooking system of claim 12, wherein the first opening is arranged at a first extent of said housing, and the swivel axis is positioned at a location of the housing adjacent a second extent of said housing generally opposite the first opening and the first extent.

14. The cooking system of claim 12, wherein the swivel structure includes at least one arcuate feature connected to the housing.

15. The cooking system of claim 12, wherein the swivel structure includes a base and at least one support arm connected to the housing, the at least one support arm includes a pin connector defining the swivel axis.

16. The cooking system of claim 12, wherein the first opening is arranged within a first plane when the housing is in the first position and the first opening is arranged within a second plane when the housing is in the second position, the first plane and the second plane being distinct.

17. The cooking system of claim 12, wherein in the first position, the internal heating compartment is oriented generally horizontally, and a plane including the first opening is oriented generally vertically.

18. The cooking system of claim 12, wherein in the second position, the internal heating compartment is oriented generally vertically, and a plane including the first opening is oriented generally horizontally.

19. The cooking system of claim 12, wherein in the first position, the internal heating compartment is oriented generally parallel to the support surface, and in the second position, the internal heating compartment is oriented generally perpendicular to the support surface.

20. The cooking system of claim 12 further comprising a door hingedly connected to the bottom wall and configured to selectively close the first opening.

21. A cooking system mountable on a support surface, the cooking system comprising:
  a housing having a front wall and a bottom wall at least partially forming an internal heating compartment configured to receive food therein, a first opening formed in the front wall of the housing for accessing the internal heating compartment, a second opening formed in the bottom wall of the housing for accessing the internal heating compartment, and a support foot protruding downward from a bottom surface of the housing through an air gap to a support surface, wherein the housing is rotatable between a first position and a second position;
  a cleaning door selectively positioned over the second opening; and
  a swivel structure arranged at an exterior of the housing and configured to rest on the support surface, the swivel structure defining a swivel axis, wherein the housing is rotatable about the swivel axis between the first position and a second position, wherein the support foot and the swivel structure are configured to rest on the support surface in the first position, and wherein only the swivel structure is configured to rest on the support surface in the second position, the swivel structure being configured to remain stationary relative to the support surface as the housing rotates about the swivel structure from the first position to the second position.

22. The cooking system of claim 21 further comprising a door hingedly connected to an external surface of the housing and configured to selectively close the first opening.

* * * * *